United States Patent
Izumi

(10) Patent No.: US 9,735,916 B2
(45) Date of Patent: Aug. 15, 2017

(54) OPTICAL RECEIVER, OPTICAL SIGNAL PROCESSING METHOD, AND OPTICAL TRANSMISSION SYSTEM

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/494,975

(22) Filed: Sep. 24, 2014

(65) Prior Publication Data
US 2015/0131996 A1    May 14, 2015

(30) Foreign Application Priority Data
Nov. 11, 2013    (JP) .................................. 2013-232802

(51) Int. Cl.
*H04J 14/06*    (2006.01)
*H04B 10/25*    (2013.01)
*H04B 10/50*    (2013.01)
*H04B 10/60*    (2013.01)
*H04B 10/67*    (2013.01)

(52) U.S. Cl.
CPC ............ *H04J 14/06* (2013.01); *H04B 10/671* (2013.01)

(58) Field of Classification Search
CPC .......... H04B 10/2569; H04B 10/07951; H04B 10/532; H04J 14/06
USPC .................................... 398/201, 209, 25, 65
See application file for complete search history.

(56) References Cited

U.S. PATENT DOCUMENTS

| 5,822,100 A * | 10/1998 | Robinson ........... H04B 10/2569 398/147 |
| 6,728,491 B1 * | 4/2004 | Ooi .................... H04B 10/2507 398/147 |
| 7,379,235 B2 * | 5/2008 | Tian .................... H04B 10/077 359/337.5 |
| 2003/0175033 A1 * | 9/2003 | Taga ...................... H04J 14/06 398/152 |
| 2004/0202480 A1 * | 10/2004 | Weid .................... G02B 6/274 398/147 |

(Continued)

FOREIGN PATENT DOCUMENTS

JP    2002-344426    11/2002
JP    2008-263590    10/2008

*Primary Examiner* — David Payne
*Assistant Examiner* — Tanya Motsinger
(74) *Attorney, Agent, or Firm* — Staas & Halsey LLP

(57) ABSTRACT

An optical receiver includes: an optical brancher configured to branch polarization multiplexed light to a first polarization multiplexed light and a second polarization multiplexed light, the polarization multiplexed light in which a pilot signal is superimposed on at least one of a first polarization and a second polarization; an optical fiber configured to transmit the first polarization multiplexed light; a first polarization rotator configured to control a first polarization state of the first polarization multiplexed light output from the optical fiber; a first polarization separator configured to separate the second polarization multiplexed light into a third polarization and a fourth polarization; and a controller configured to control the first polarization rotator based on one of a first pilot signal included in the third polarization and a second pilot signal included in the fourth polarization.

16 Claims, 17 Drawing Sheets

(56) References Cited

U.S. PATENT DOCUMENTS

| | | | |
|---|---|---|---|
| 2006/0210211 A1* | 9/2006 | Taylor | H04J 14/02 385/1 |
| 2008/0131137 A1* | 6/2008 | Okabe | H04J 14/08 398/152 |
| 2008/0131138 A1* | 6/2008 | Futami | G01J 11/00 398/152 |
| 2008/0138070 A1* | 6/2008 | Yan | H04J 14/06 398/65 |
| 2008/0232816 A1 | 9/2008 | Hoshida et al. | |
| 2010/0034541 A1* | 2/2010 | Xie | H04B 10/2569 398/152 |
| 2010/0315640 A1* | 12/2010 | Webb | H04B 10/2569 356/364 |
| 2011/0182572 A1* | 7/2011 | Klekamp | H04B 10/07951 398/25 |

* cited by examiner

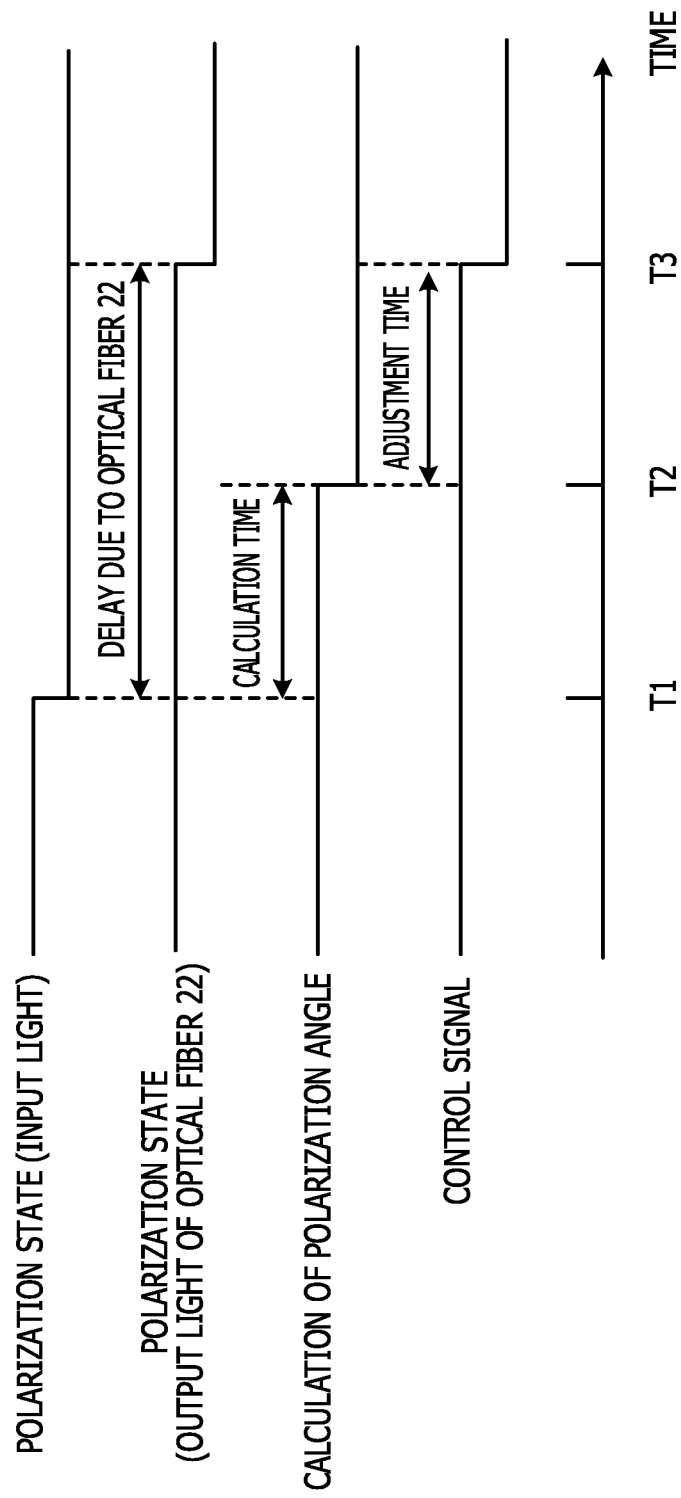

OPTICAL RECEIVER, OPTICAL SIGNAL PROCESSING METHOD, AND OPTICAL TRANSMISSION SYSTEM

CROSS-REFERENCE TO RELATED APPLICATION

This application is based upon and claims the benefit of priority of the prior Japanese Patent Application No. 2013-232802, filed on Nov. 11, 2013, the entire contents of which are incorporated herein by reference.

FIELD

The embodiments discussed herein are related to an optical receiver, an optical signal processing method, and an optical transmission system.

BACKGROUND

In a polarization multiplexed transmission of an optical transmission system, a signal is transmitted using a set of mutually orthogonal polarizations. Therefore, the polarization multiplexed transmission provides a transmission capacity which is twice the transmission capacity of single polarization transmission.

Related technology is disclosed in Japanese Laid-open Patent Publication No. 2008-263590 and Japanese Laid-open Patent Publication No. 2002-344426.

SUMMARY

According to an aspect of the embodiments, an optical receiver includes: an optical brancher configured to branch polarization multiplexed light to a first polarization multiplexed light and a second polarization multiplexed light, the polarization multiplexed light in which a pilot signal is superimposed on at least one of a first polarization and a second polarization; an optical fiber configured to transmit the first polarization multiplexed light; a first polarization rotator configured to control a first polarization state of the first polarization multiplexed light output from the optical fiber; a first polarization separator configured to separate the second polarization multiplexed light into a third polarization and a fourth polarization; and a controller configured to control the first polarization rotator based on one of a first pilot signal included in the third polarization and a second pilot signal included in the fourth polarization.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of polarization state control;

DESCRIPTION OF EMBODIMENTS

A polarization multiplexed optical signal is separated into polarizations, for example, by digital signal processing of an optical receiver. For example, received light is converted to electrical signals in an optical receiver. A digital filter operation is performed on the electrical signals, and transmitted signal is separated into a set of signals using a set of polarizations. In this scheme, the amount of operation of digital signal processing may be large.

An optical transmitter of a polarization multiplexing optical transmission and reception system modulates and outputs one of the wavelength, transmission timing, and strength of light which is transmitted wave, using a low frequency signal transmitted from a low frequency generator. A polarization multiplexer combines the modulated two output light beams to generate a polarization multiplexed optical signal, the two light beams being in a polarization state in which the two light beams are mutually orthogonal. A polarization separator extracts and separates two orthogonal polarization components from the polarization multiplexed optical signal having a polarization state which is controlled by a polarization control unit. A band pass filter extracts a component, which passes through a pass band, from output signals of an optical receiving unit and outputs the strength of the component. A control circuit generates a feedback control signal for maximizing the ratio of low frequency signal component based on the strength of the output from the band pass filter. The polarization control unit controls the polarization state of the polarization multiplexed optical signal using the feedback control signal. Also, separation into a polarization may be made by signal processing at a rate lower than the transmission signal rate.

The polarization separation may be performed in an optical area. However, for example when the polarization state of an optical transmission path changes, proper separation into two polarizations may not be made. After the polarization state of the optical transmission path changes, it may take time to separate into two polarizations.

Figure 1:
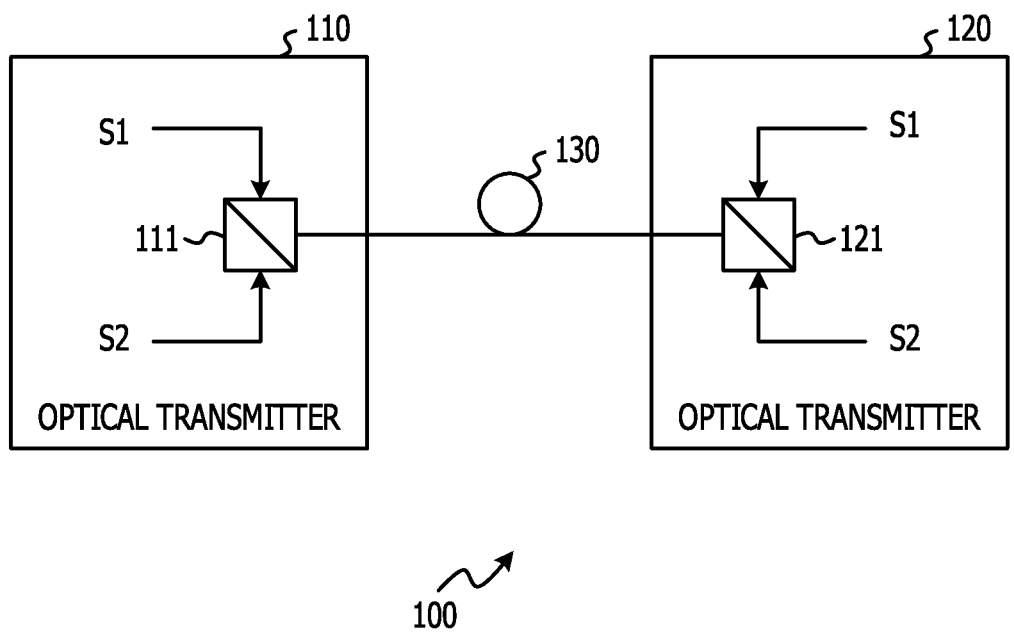
FIG. 1 illustrates an example of an optical transmission system.

FIG. 1 illustrates an example of an optical transmission system. An optical transmission system 100 has an optical transmitter 110 and an optical receiver 120. A transmission path optical fiber 130 is provided between the optical transmitter 110 and the optical receiver 120. One or more optical amplifiers may be provided between the optical transmitter 110 and the optical receiver 120.

The optical transmitter 110 may receive an optical signal S1 and an optical signal S2. The optical transmitter 110 may generate an optical signal S1 and an optical signal S2. The optical transmitter 110 has a polarization multiplexer 111. The polarization multiplexer 111 may generate a polarization multiplexed optical signal from the optical signal S1 and the optical signal S2. A polarization multiplexed optical signal allows a set of signals to be transmitted using a set of mutually orthogonal polarizations (X polarization and Y polarization). For example, the optical signal S1 may be transmitted using X polarization and the optical signal S2 may be transmitted using Y polarization.

The optical receiver 120 receives a polarization multiplexed optical signal which is transmitted from the optical transmitter 110 via the transmission path optical fiber 130. The optical receiver 120 has a polarization separator 121. The polarization separator 121 reproduces the optical signal S1 and the optical signal S2 from the received polarization multiplexed optical signal.

When a polarization multiplexed optical signal is transmitted via the transmission path optical fiber 130, the polarization state of the polarization multiplexed optical signal, for example, the direction or angle of a polarization may change. When the state of the transmission path optical fiber 130 changes, the angle of a polarization of the polarization multiplexed optical signal received by the optical receiver 120 may also change. For example, when a user or a network administrator of the optical transmission system 100 comes into contact with the transmission path optical fiber 130, the angle of a polarization of the polarization multiplexed optical signal received by the optical receiver 120 may change. For this reason, the optical receiver 120 may monitor the polarization state of a received polarization multiplexed optical signal, and may control the polarization state according to a result of the monitoring.

In the optical transmission system of FIG. 1, the polarization state of a polarization multiplexed optical signal is controlled by using a pilot signal. For example, the optical transmitter 110 adds a pilot signal to at least one of the optical signals S1 and S2 to generate a polarization multiplexed optical signal from the optical signal. The optical receiver 120 controls the polarization state of a polarization multiplexed optical signal using the pilot signal included in the polarization multiplexed optical signal.

Figure 2:
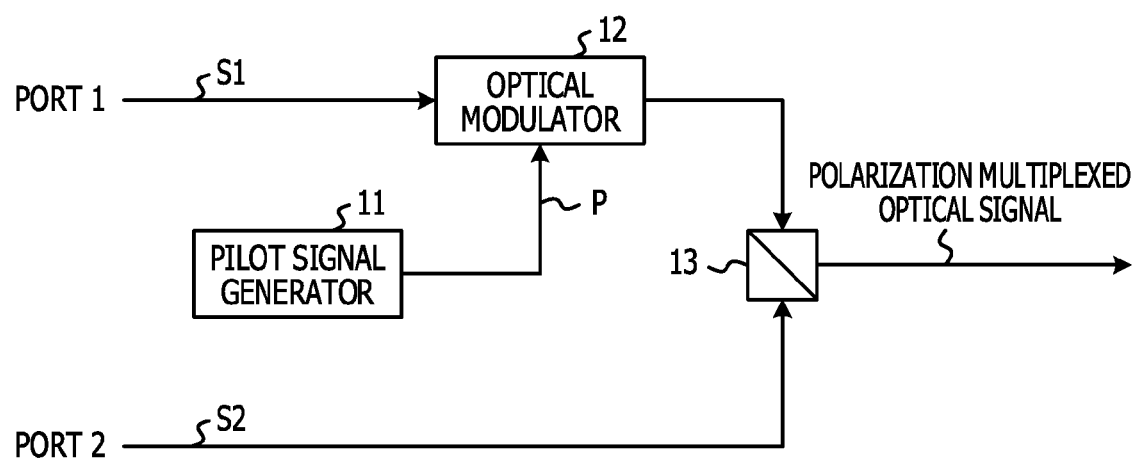
FIG. 2 illustrates an example of an optical transmitter.

FIG. 2 illustrates an example of an optical transmitter. The optical transmitter illustrated in FIG. 2 may be used in the optical transmission system illustrated in FIG. 1. An optical transmitter 10 illustrated in FIG. 2 has a pilot signal generator 11, an optical modulator 12, and a polarization multiplexer 13. The optical transmitter 10 receives the optical signals S1 and S2 via ports P1 and P2, respectively.

The optical signals S1 and S2 each may be, for example, a modulated optical signal that transmits data. The wavelength of the optical signals S1 and S2 may be substantially the same. The modulation schemes for the optical signals S1 and S2 may be substantially the same or may be different from each other. The symbol rates of the optical signals S1 and S2 may be substantially the same or may be different from each other. The optical signals S1 and S2 may be generated in the optical transmitter 10.

The pilot signal generator 11 generates a pilot signal P. The pilot signal P is expressed, for example, by the following expression.

$$P = A + B \sin(\omega t)$$

A indicates a DC bias component. B indicates the amplitude of a pilot signal P. $\omega$ indicates the angular frequency of the pilot signal P. In the following description, the angular frequency and the frequency may be used without being distinguished. For example, $\omega$ may indicate the angular frequency of a pilot signal P and may indicate the frequency of a pilot signal P. The frequency of a pilot signal P may be sufficiently low compared with the symbol rates of the optical signals S1 and S2.

The optical modulator 12 superimposes a pilot signal P on an optical signal S1. At this point, the optical modulator 12 may superimpose the pilot signal P on the optical signal S1, for example, by an intensity modulation. The optical modulator 12 may superimpose the pilot signal P on the optical signal S1 by another modulation scheme.

The polarization multiplexer 13 uses a set of mutually orthogonal polarizations (X polarization and Y polarization) to multiplex the optical signals S1 and S2 and generates a polarization multiplexed optical signal. The optical transmitter 10 transmits the polarization multiplexed optical signal. At this point, as one example, the optical signal S1 is transmitted using X polarization and the optical signal S2 is transmitted using Y polarization. The pilot signal P is superimposed on the optical signal S1. X polarized light of a polarization multiplexed optical signal transmitted from the optical transmitter 10 includes the pilot signal P.

Figure 3:
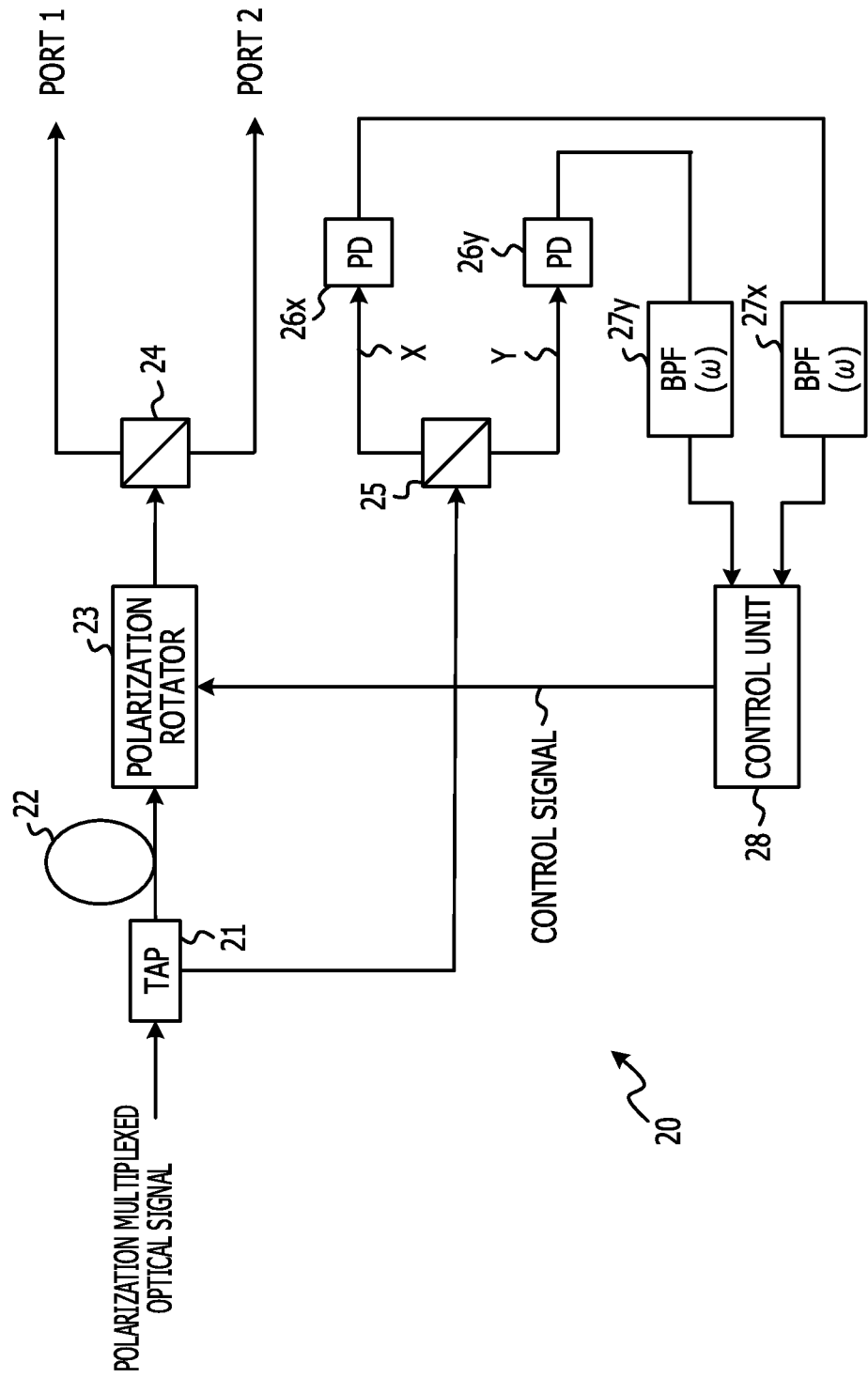
FIG. 3 illustrates an example of an optical receiver.

FIG. 3 illustrates an example of an optical receiver. The optical receiver illustrated in FIG. 3 may be used in the optical transmission system illustrated in FIG. 1. The optical transmitter 20 illustrated in FIG. 3 has an optical brancher 21, an optical fiber 22, a polarization rotator 23, a polarization separator 24, a polarization separator 25, optical receivers (PD) 26x, 26y, band pass filters (BPF) 27x, 27y, and a control unit 28. The optical receiver 20 receives a polarization multiplexed optical signal that is generated by the optical transmitter 10 illustrated in FIG. 2 via a transmission path optical fiber.

The optical brancher (TAP) 21 causes a polarization multiplexed optical signal to branch to the optical fiber 22 and the polarization separator 25. For example, a polarization multiplexed optical signal, which has been tapped on the input side of the optical fiber 22, is guided to the polarization separator 25. The optical brancher 21 may include an optical coupler, for example.

The optical fiber 22 adds a specified delay to a polarization multiplexed optical signal output from the optical brancher 21. The length of the optical fiber 22 is determined according to the specified delay time. For example, when the specified delay time is 10 μs and the transmission rate of light through the optical fiber is approximately $2 \times 10^8$ m/s, the optical fiber may be approximately 2 km in length. The optical fiber 22 may be a polarization-maintaining fiber that maintains the polarization state of transmitted light, for example, a polarization-maintaining and absorption reducing (PANDA) fiber.

The polarization rotator 23 controls the polarization state of a polarization multiplexed optical signal output from the optical fiber 22, according to a control signal generated by the control unit 28. The polarization separator 24 has a set of mutually orthogonal polarization axes (X polarization axis and Y polarization axis). The polarization separator 24 extracts a set of mutually orthogonal polarization components from a polarization multiplexed optical signal which is controlled by the polarization rotator 23. A set of polarization components extracted by the polarization separator 24 is guided to the port 1 or 2.

A polarization multiplexed optical signal, which has been tapped on the input side of the optical fiber 22, is guided to the polarization separator 25. An optical path between the optical brancher 21 and the polarization separator 25 may be sufficiently short. The polarization state may be substantially maintained in the optical path. The polarization separator 25 also has a set of mutually orthogonal polarization axes (X polarization axis and Y polarization axis). The polarization separator 25 extracts a set of mutually orthogonal polarization components from the polarization multiplexed optical signal which has been tapped on the input side of the optical fiber 22. The polarization axes of the polarization separator 24 and the polarization axes of the polarization separator 25 may be substantially the same.

A set of polarization components extracted by the polarization separator 25 is guided to the optical receiver 26x or 26y. The polarization component guided from the polarization separator 25 to the optical receiver 26x or 26y may be referred to as a polarization component x or y. The optical receivers 26x and 26y each convert a corresponding polarization component x or y to an electrical signal.

The BPFs 27x and 27y each filter the electrical signal output from the optical receiver 26x or 26y. The BPFs 27x and 27y allow frequency ω, for example, the frequency of a pilot signal P to pass through. For example, the output signal of the BPF 27x represents the pilot signal P included in the polarization component x. Similarly, the output signal of the BPF 27y represents the pilot signal P included in the polarization component y.

The control unit 28 generates a control signal which controls the polarization rotator 23 based on the output signals of the BPFs 27x and 27y. At this point, the control unit 28 may control the polarization rotator 23 so that the polarization state of the polarization multiplexed optical signal output from the polarization rotator 23 matches the polarization axis of the polarization separator 24. The control unit 28 may include a hardware circuit, for example. The function of the control unit 28 may be performed by a processor that executes a program. For example, the function of the control unit 28 may be performed by a combination of software and hardware.

Figure 4A:
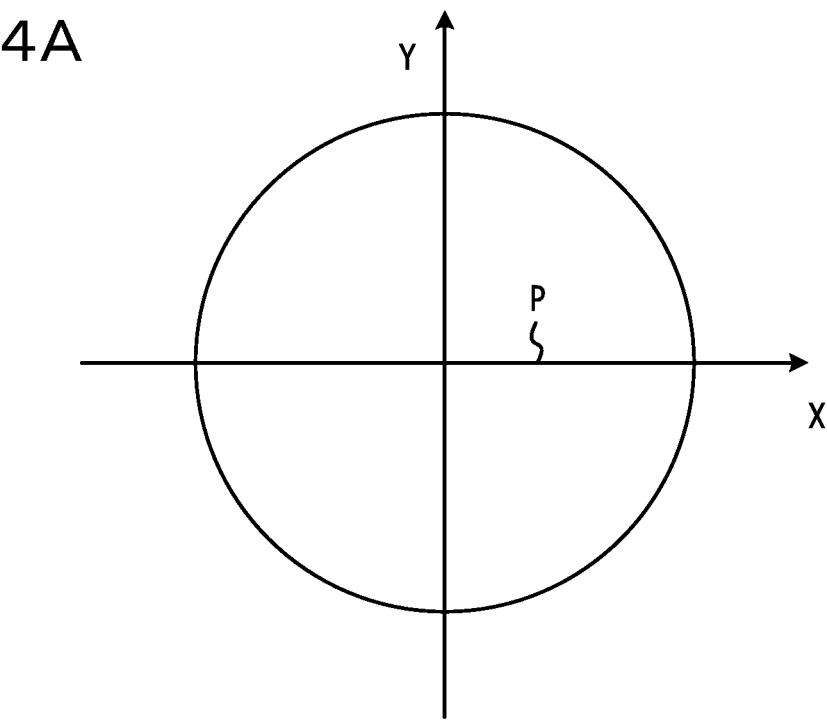
FIGS. 4A and 4B illustrate an example of an operation of a control unit.
Figure 4B:
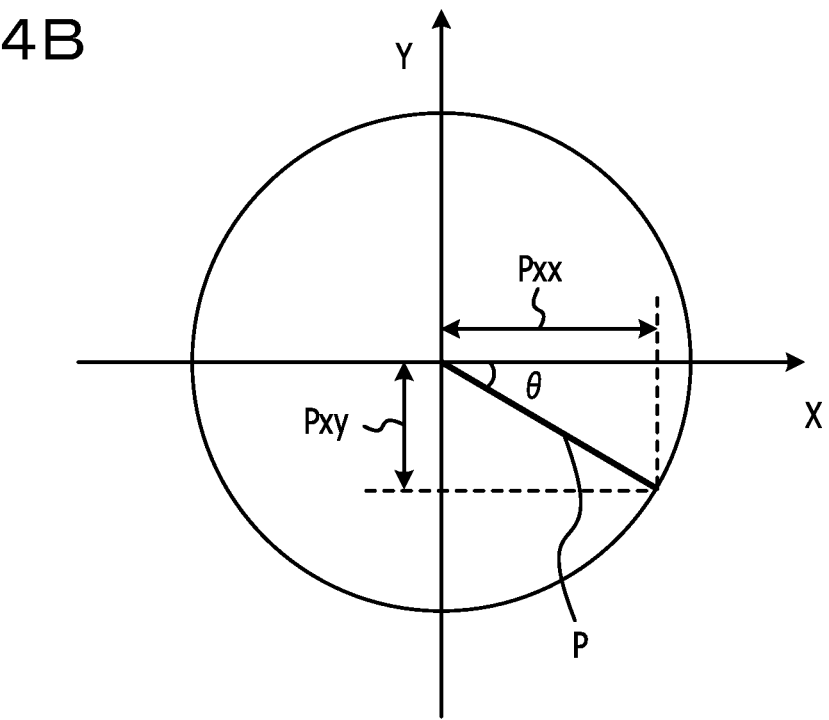

FIGS. 4A and 4B illustrate an example of an operation of a control unit. For example, as illustrated in FIG. 4A, a pilot signal P is superimposed on X polarization in the optical transmitter 10. In FIG. 4B, the X-axis indicates one of the polarization axes of the polarization separators 24 and 25, for example, the X polarization axis. The Y-axis indicates the other one of the polarization axes of the polarization separators 24 and 25, for example, the Y polarization axis. The optical fiber 22 maintains the polarization state in the optical receiver 20. The polarization axes of the polarization separator 24 and the polarization axes of the polarization separator 25 may be substantially the same. For example, when the polarization rotator 23 is not provided, the polarization state of light output from the polarization separator 24 and the polarization state of light output from the polarization separator 25 may be substantially the same.

The optical transmitter 10 transmits a polarization multiplexed optical signal in which a pilot signal P is superimposed on X polarization as illustrated in FIG. 4A. At this point, Y polarization does not include a pilot signal P. The polarization state may change in the transmission path optical fiber 130. As a result, as illustrated in FIG. 4B, the polarization of a polarization multiplexed optical signal received by the optical receiver 20 has rotated by $-\theta$ with respect to X-Y polarization axes.

In this case, strength Pxx of the pilot signal P included in the polarization component x, which is extracted by the X polarization axis of the polarization separator 25, is expressed by cos θ. Strength Pxy of the pilot signal P included in the polarization component y, which is extracted by the Y polarization axis of the polarization separator 25, is expressed by sine. The control unit 28 calculates the angle θ by detecting the strength (Pxx, Pxy) of the pilot signal P included in the polarization components x and y. For example, the strength of the pilot signal P is normalized in FIGS. 4A and 4B.

The control unit 28 controls the polarization rotator 23 based on the calculated angle θ. In FIGS. 4A and 4B, the control unit 28 supplies a control signal to the polarization rotator 23, the control signal specifying that "rotation angle=+θ". The polarization rotator 23 rotates the polarization of a polarization multiplexed optical signal, which is output from the optical fiber 22, by θ. Consequently, the polarization state of the polarization multiplexed optical signal output from the polarization rotator 23 substantially matches the polarization axes of the polarization separator 24, and thus the optical signals S1 and S2 multiplexed by the optical transmitter 10 may be separated with sufficient precision.

For example, the frequency of the pilot signal P may be sufficiently low compared with the symbol rates of the optical signals S1 and S2. For example, the frequency of the pilot signal P may be approximately 1 to 10 MHz. In order to reduce an error caused by noise or the like, the control unit 28 monitors the strength of the pilot signal P over a certain time and calculates the rotation angle based on the average of the result of the monitoring. For example when the frequency of the pilot signal P is 10 MHz and the rotation angle is calculated using the pilot signal P of 10 cycles, the calculation time taken for the control unit 28 may be approximately 1 µs.

In this manner, a certain calculation time may be taken for the control unit 28 to calculate the rotation angle. For example, when the optical receiver 20 does not have the optical fiber 22 and the control unit 28 calculates the rotation angle in a time area, an optical signal corresponding to the time area has already passed through the polarization rotator 23. In this case, the polarization multiplexed optical signal may not be separated with sufficient precision by the polarization separator 24. For example, when the polarization state of a polarization multiplexed optical signal changes rapidly, the precision of polarization separation may significantly reduce and data may not be reproduced from the optical signals S1 and S2.

For example, the optical receiver 20 has the optical fiber 22 on the input side of the polarization rotator 23. The length of the optical fiber 22 may be designed so that the delay time due to the optical fiber 22, for example, the transmission time of light through the optical fiber 22 is longer than the calculation time taken for the control unit 28.

FIG. 5 illustrates an example of polarization state control. In FIG. 5, the polarization state of a polarization multiplexed optical signal, which is input to the optical receiver 20, changes at time T1. The polarization multiplexed optical signal is transmitted through the optical fiber 22 and guided to the polarization rotator 23. Thus, a change in the polarization state occurs at time T3 in the polarization rotator 23.

As described above, the control unit 28 monitors the strength of the pilot signal P included in the polarization components x and y which are extracted from the polarization multiplexed optical signal. The control unit 28 calculates a change in the polarization state, for example, a polarization rotation angle according to a result of the monitoring. A calculation result corresponding to a change in the polarization state at the time T1 may be obtained at time T2. The optical fiber 22 may be designed so that the delay time due to the optical fiber 22 is longer than the calculation time taken for the control unit 28. Thus, before a change in the polarization state occurs in the polarization rotator 23, calculation of the rotation angle corresponding to the change in the polarization state may be completed.

The control unit 28 generates a control signal for compensating the calculated rotation angle, and supplies the control signal to the polarization rotator 23. At this point, the control unit 28 may delay the control signal by a certain adjustment time to supply the control signal to the polarization rotator 23. The adjustment time may correspond to, for example, the difference between the delay time due to the optical fiber 22 and the calculation time taken for the control unit 28. When the delay time due to the optical fiber 22 is determined by the length of the optical fiber 22, the delay time for the optical fiber 22 may be known. The calculation time taken for the control unit 28 may also be pre-specified. Thus, when the polarization state of a polarization multiplexed optical signal changes, an effect due to the change may be reduced in a short time.

Figure 6:
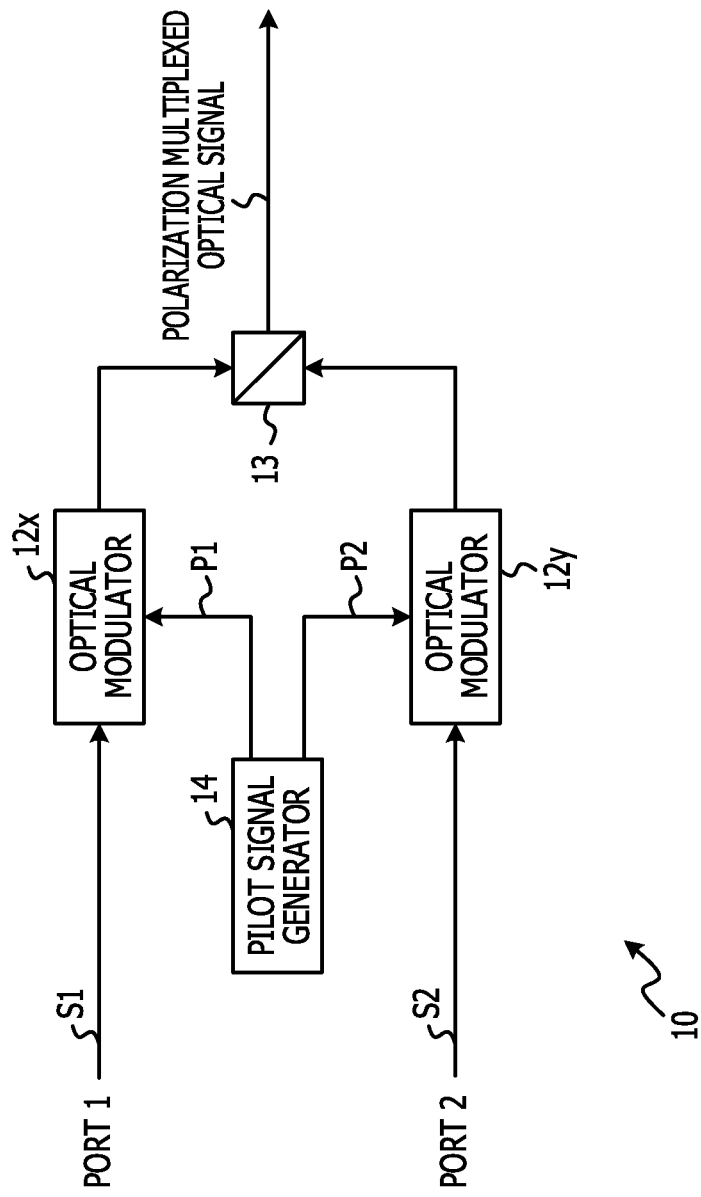
FIG. 6 illustrates an example of an optical transmitter.

FIG. 6 illustrates an example of an optical transmitter. The optical transmitter illustrated in FIG. 6 may be used in the optical transmission system illustrated in FIG. 1. The optical transmitter 10 illustrated in FIG. 6 has a pilot signal generator 14, optical modulators 12x, 12y, and the polarization multiplexer 13. The optical transmitter 10 receives an input of optical signal S1 or S2 via the port P1 or P2. These optical signals S1 and S2 may be substantially the same as or similar to the optical signals S1 and S2 illustrated in FIGS. 1 to 5, and description may be omitted or reduced.

The pilot signal generator 14 generates pilot signals P1 and P2. The pilot signals P1 and P2 are expressed, for example, by the following expression.

$$P1 = A + B\sin(\omega_a t)$$

$$P2 = A + B\sin(\omega_b t)$$

A indicates a DC bias component. B indicates the amplitude of a pilot signal P. $\omega_a$ indicates the angular frequency of the pilot signal P1. $\omega_b$ indicates the angular frequency of the pilot signal P2. As expressed above, the amplitudes of the pilot signals P1 and P2 may be substantially the same. The frequencies of the pilot signals P1 and P2 may be different from each other. For example, the frequencies of the pilot signals P1 and P2 may be sufficiently low compared with the symbol rates of the optical signals S1 and S2.

The optical modulator 12x superimposes the pilot signal P1 on the optical signal S1. Similarly, the optical modulator 12y superimposes the pilot signal P2 on the optical signal S2. The optical modulators 12x and 12y each superimpose a pilot signal on a corresponding optical signal, for example, by an intensity modulation. The optical modulators 12x and 12y may each superimpose a pilot signal on a corresponding optical signal by another modulation scheme.

The polarization multiplexer 13 generates a polarization multiplexed optical signal by multiplexing the optical signals S1 and S2 using a set of mutually orthogonal polarizations (X polarization and Y polarization). The optical transmitter 10 transmits the polarization multiplexed optical signal. For example, the optical signal S1 is transmitted using X polarization, and the optical signal S2 is transmitted using Y polarization. The pilot signal P1 is superimposed on the optical signal S1, and the pilot signal P2 is superimposed on the optical signal S2. In a polarization multiplexed optical signal transmitted from the optical transmitter 10, X polarized light includes the pilot signal P1 and Y polarized light includes the pilot signal P2.

Figure 7:
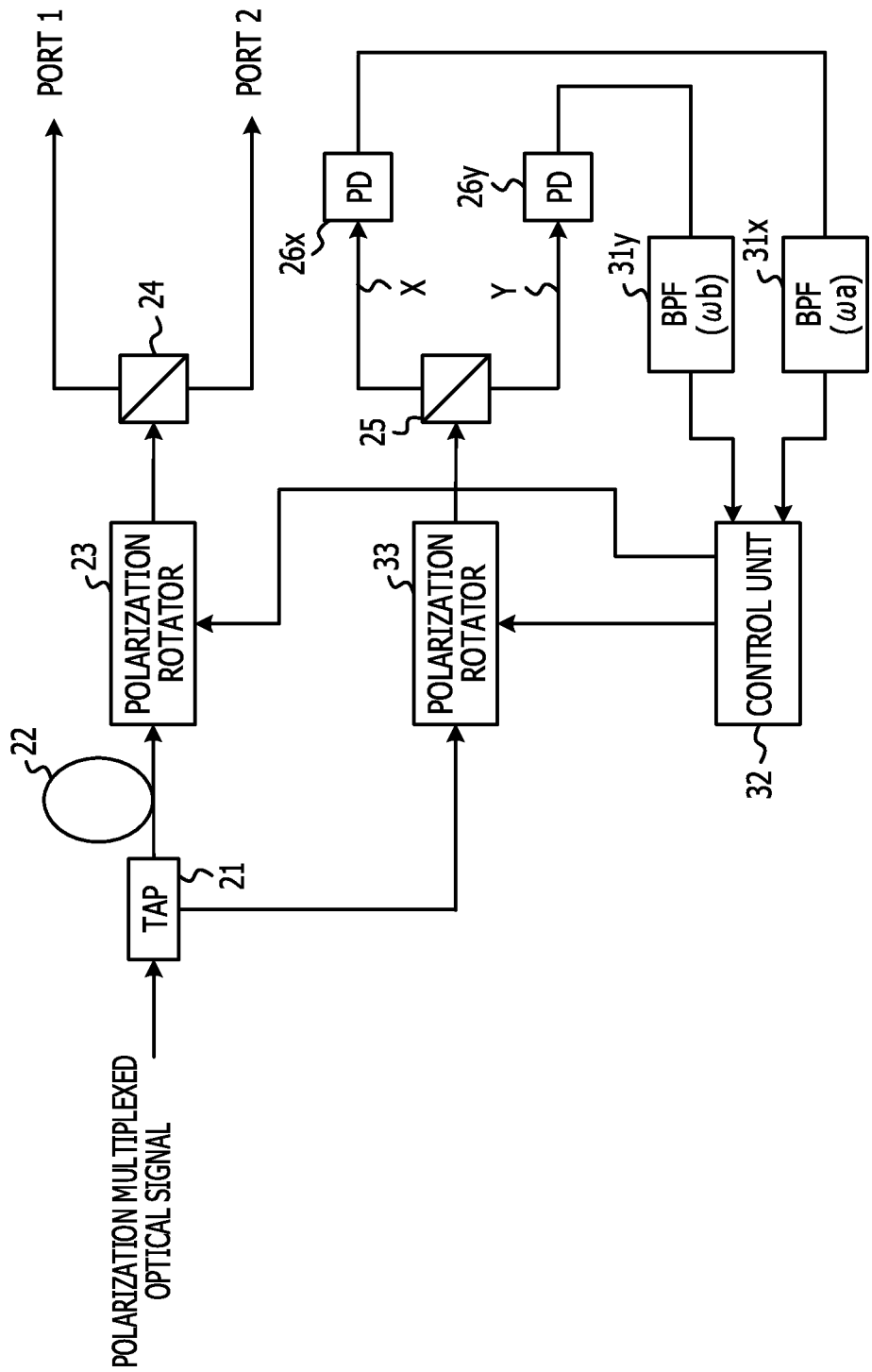
FIG. 7 illustrates an example of an optical receiver.

FIG. 7 illustrates an example of an optical receiver. The optical receiver illustrated in FIG. 7 may be used in the optical transmission system illustrated in FIG. 1. The optical transmitter 20 illustrated in FIG. 7 has the optical brancher 21, the optical fiber 22, the polarization rotator 23, the polarization separator 24, the polarization separator 25, the optical receivers 26x, 26y, BPFs 31x, 31y, a control unit 32, and a polarization rotator 33. The optical receiver 20 receives a polarization multiplexed optical signal, which is generated by the optical transmitter 10 illustrated in FIG. 6, via a transmission path optical fiber. The optical brancher 21, the optical fiber 22, the polarization rotator 23, the polarization separator 24, the polarization separator 25, and the optical receivers 26x, 26y may be substantially the same as or similar to the elements illustrated in FIGS. 2 to 5, and description may be omitted or reduced.

The polarization components x and y are extracted from a polarization multiplexed optical signal by the polarization separator 25. The polarization multiplexed optical signal includes the pilot signals P1 and P2. The polarization state of a polarization multiplexed optical signal may change between the optical transmitter 10 and the optical receiver 20. The polarization component x includes both the pilot signals P1 and P2. Similarly, the polarization component y includes both the pilot signals P1 and P2. For example, when the polarization of a polarization multiplexed optical signal is controlled in an ideal state, the polarization component x may substantially include one of the pilot signals, for example, P1, and the polarization component y may substantially include the other of the pilot signals, for example, P2.

The BPFs 31x and 31y each filter an electrical signal which is output from the optical receiver 26x or 26y. The BPF 31x allows the frequency $\omega_a$, for example, the frequency of the pilot signal P1 to pass through. The output signal of the BPF 31x represents the pilot signal P1 included in the polarization component x. The BPF 31y allows the frequency $\omega_b$, for example, the frequency of the pilot signal P2 to pass through. The output signal of the BPF 31y represents the pilot signal P2 included in the polarization component y.

The polarization rotator 33 is provided between the optical brancher 21 and the polarization separator 25. The polarization rotator 33 controls the polarization state of a polarization multiplexed optical signal, which is tapped on the input side of the optical fiber 22, according to a control signal generated by the control unit 32. The polarization separator 25 extracts polarization components x and y from a polarization multiplexed optical signal for which the polarization state is controlled by the polarization rotator 33.

The control unit 32 generates a control signal which controls the polarization rotators 23 and 33, based on output signals of the BPFs 31x and 31y. For example, the control unit 32 may generate control signals that control the polarization rotators 23 and 33 so that the following conditions are satisfied.

(a) the strength of the pilot signal P1 included in polarization component x is maximized, the polarization component x being extracted from a polarization multiplexed optical signal by one of the polarization axes of the polarization separator 25, for example, by the X polarization axis.

(b) the strength of the pilot signal P2 included in polarization component y is maximized, the polarization component y being extracted from a polarization multiplexed optical signal by the other one of the polarization axes of the polarization separator 25, for example, by the Y polarization axis.

In a polarization multiplexed optical signal, a set of mutually orthogonal polarizations are used and the optical signals S1 and S2 are multiplexed. The pilot signal P1 is superimposed on the optical signal S1, and the pilot signal P2 is superimposed on the optical signal S2. In this case, the condition (a) is satisfied when the polarization state of the optical signal S1 on which the pilot signal P1 is superimposed substantially matches the X polarization axis of the polarization separator 25. The condition (a) may be detected by monitoring the strength of the output signal of the BPF 31x. The condition (b) is satisfied when the polarization state of the optical signal S2 on which the pilot signal P2 is superimposed substantially matches the Y polarization axis of the polarization separator 25. Also, the condition (b) may be detected by monitoring the strength of the output signal of the BPF 31y.

The control unit 32 generates control signals so that the strength of the pilot signal P1 included in the polarization component x is maximized and the strength of the pilot signal P2 included in the polarization component y is maximized. Thus, the polarization direction of the optical signal S1 on which the pilot signal P1 is superimposed may substantially match the X polarization axis of the polarization separator 25, and the polarization direction of the optical signal S2 on which the pilot signal P2 is superimposed may substantially match the Y polarization axis of the polarization separator 25.

The control unit 32 may include, for example, a hardware circuit. The function of the control unit 32 may be performed by a processor that executes a given program. The function of the control unit 32 may be performed by a combination of software and hardware.

The control unit 32 supplies substantially the same control signal to the polarization rotator 23 and the polarization rotator 33. The polarization axes of the polarization separator 24 and the polarization axes of the polarization separator 25 are substantially the same. Thus, when the above-described control is performed, the polarization direction of the optical signal S1 substantially matches the X polarization axis of the polarization separator 24 and the polarization direction of the optical signal S2 substantially matches the Y polarization axis of the polarization separator 24. An input polarization multiplexed optical signal may be separated into polarizations with sufficient precision by the polarization separator 24.

For example, when the strength of the pilot signal P1 included in the polarization component x is maximized, the strength of the pilot signal P2 included in the polarization component y is also maximized. For example, when the strength of the pilot signal P2 included in the polarization component y is maximized, the strength of the pilot signal P1 included in the polarization component x is also maximized. The control unit 32 may control the polarization rotator 23 or 33 so as to satisfy one of the above-described conditions (a) and (b).

The control unit 32 does not have to maximize the strength of the pilot signal P1 or P2. For example, it may be sufficient that the control unit 32 continues to perform processing for increasing the strength of the output signal of the BPF 31x.

The control unit 32 may send a control signal to the polarization rotator 23 or 33, for example, according to the timing chart illustrated in FIG. 5. The control unit 32 may send a control signal at a different timing to the polarization rotator 23 or 33.

The control unit 32 may control the polarization rotator 23 or 33 using dithering. The control unit 32 superimposes a dithering signal on a control signal to be supplied to the polarization rotator 33. The dithering signal may be a low frequency signal having a frequency different from that of the pilot signals P1 and P2, for example. The strength of the output signals of the BPFs 31x and 31y changes according to the dithering signal. The control unit 32 searches for a maximum of the strength of the output signals of the BPFs 31x and 31y using the change in the strength of the output signal of the BPF 31x or 31y. According to this method, precision and response speed in following a change in polarization in the transmission path optical fiber may improve.

Figure 8:
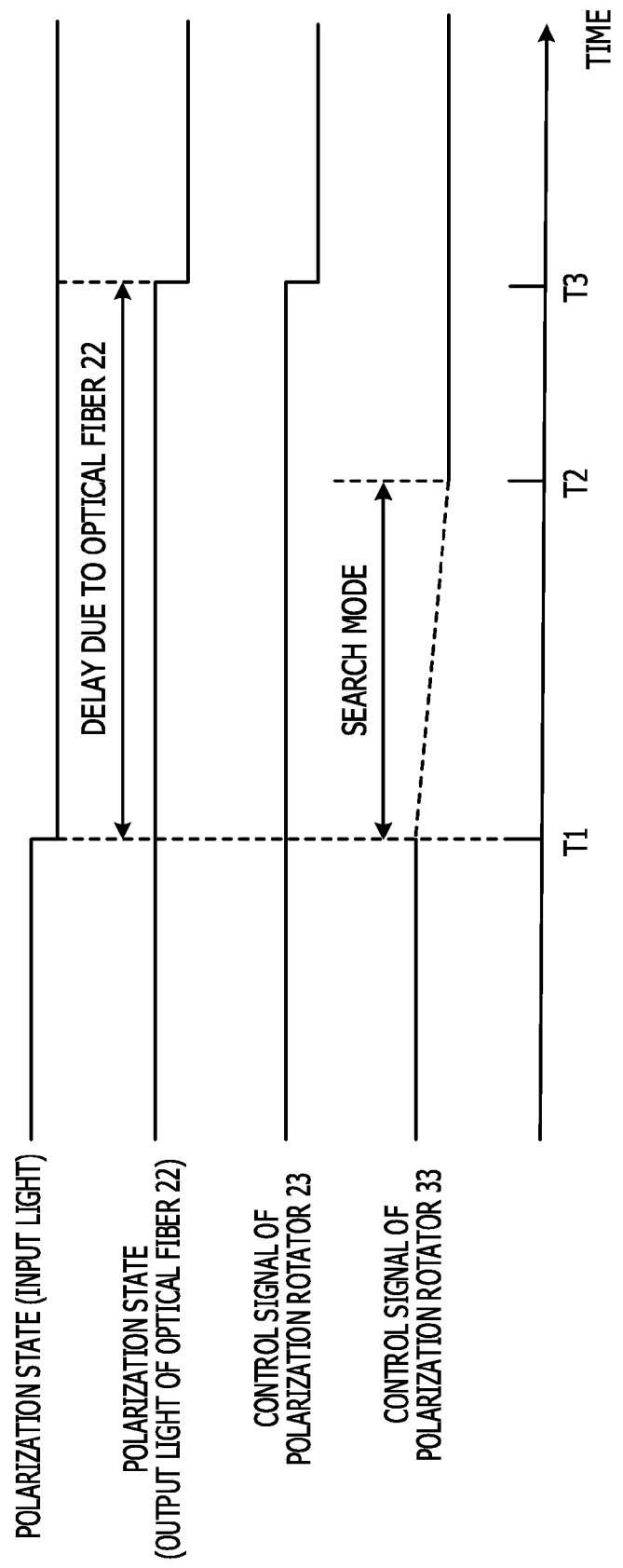
FIG. 8 illustrates an example of polarization state control.

FIG. 8 illustrates an example of polarization state control. In FIG. 8, the polarization state is stable before the time T1. The "stable polarization state" may include a state in which the polarization state changes slowly. At the time T1, the polarization state of a polarization multiplexed optical signal input to the optical receiver 20 may change rapidly. The polarization multiplexed optical signal is transmitted through the optical fiber 22 and is guided to the polarization rotator 23. At the time T3, a rapid change in the polarization state occurs in the polarization rotator 23.

The control unit 32 calculates a polarization state that maximizes the pilot signal, based on the output signal of the BPF 31x or 31y, and generates a control signal for obtaining the polarization state. The control unit 32 supplies the control signal to the polarization rotators 23 and 33.

The polarization state is stable before the time T1. In this case, the polarization state of a polarization multiplexed optical signal (hereinafter referred to as an input polarization multiplexed optical signal) input to the optical receiver 20 and the polarization state of a polarization multiplexed optical signal (hereinafter referred to as a delayed polarization multiplexed optical signal) input to the polarization rotator 23 may be substantially the same. Thus, the control unit 32 sends the same control signal to the polarization rotators 23 and 33 before the time T1.

When the polarization state of an input polarization multiplexed optical signal changes rapidly, the control unit 32 may not be able to follow the polarization state of the input polarization multiplexed optical signal temporarily. Thus, when the polarization state of an input polarization multiplexed optical signal changes rapidly at the time T1, the control unit 32 switches the operation mode from normal mode to search mode, and starts to search for the polarization state of the input polarization multiplexed optical signal.

In the search mode, the control unit 32 monitors the strength of the pilot signal, while generating and supplying a control signal to the polarization rotator 33, the control signal for sweeping the polarization rotation angle over a certain range. In FIG. 8, during time T1 to T2, a control signal for sweeping the polarization rotation angle is supplied to the polarization rotator 33, and the strength of the pilot signal is monitored. By the monitoring, the control unit 32 determines the polarization rotation angle (hereinafter referred to as the optimal polarization angle) that maximizes the strength of the pilot signal.

The time (T1 to T2) taken to determine the optimal polarization angle may be shorter than the delay time (T1 to T3) due to the optical fiber 22. The delay time due to the optical fiber 22 may be determined by the length of the optical fiber 22. The calculation time taken for the control unit 32 may be determined based on the sweeping range of polarization angle, the sampling interval of polarization angle, and/or the calculation time for a sampling operation. After the search mode is terminated at the time T2, the control unit 32 supplies a control signal corresponding to the determined optimal polarization angle to the polarization rotator 33. The control unit 32 supplies the control signal, which is generated based on the output signals of the BPFs 31x and 31y, to the polarization rotator 33 after the time T2.

A polarization multiplexed optical signal guided to the polarization rotator 23 is delayed by the optical fiber 22.

Therefore, even when the polarization state of an input polarization multiplexed optical signal changes rapidly at the time T1, the polarization state of a delayed polarization multiplexed optical signal input to the polarization rotator 23 remains stable during the time period T1 to T3. The control unit 32, when detecting a rapid change in the polarization state at the time T1, keeps the control signal to be supplied to the polarization rotator 23, during a period until the delay time of the optical fiber 22 has passed. At this point, a control signal, which has been obtained immediately before the time T1, is supplied to the polarization rotator 23. When the delay time of the optical fiber 22 has passed, the control unit 32 supplies a control signal to the polarization rotator 23 at the time T3, the control signal corresponding to the optimal polarization angle which is determined in the search mode. The control unit 32 supplies a control signal, which is generated based on the output signals of the BPFs 31x and 31y, to the polarization rotator 23. For example, substantially the same control signal is supplied to the polarization rotators 23 and 33 after the time T3.

Figure 9:
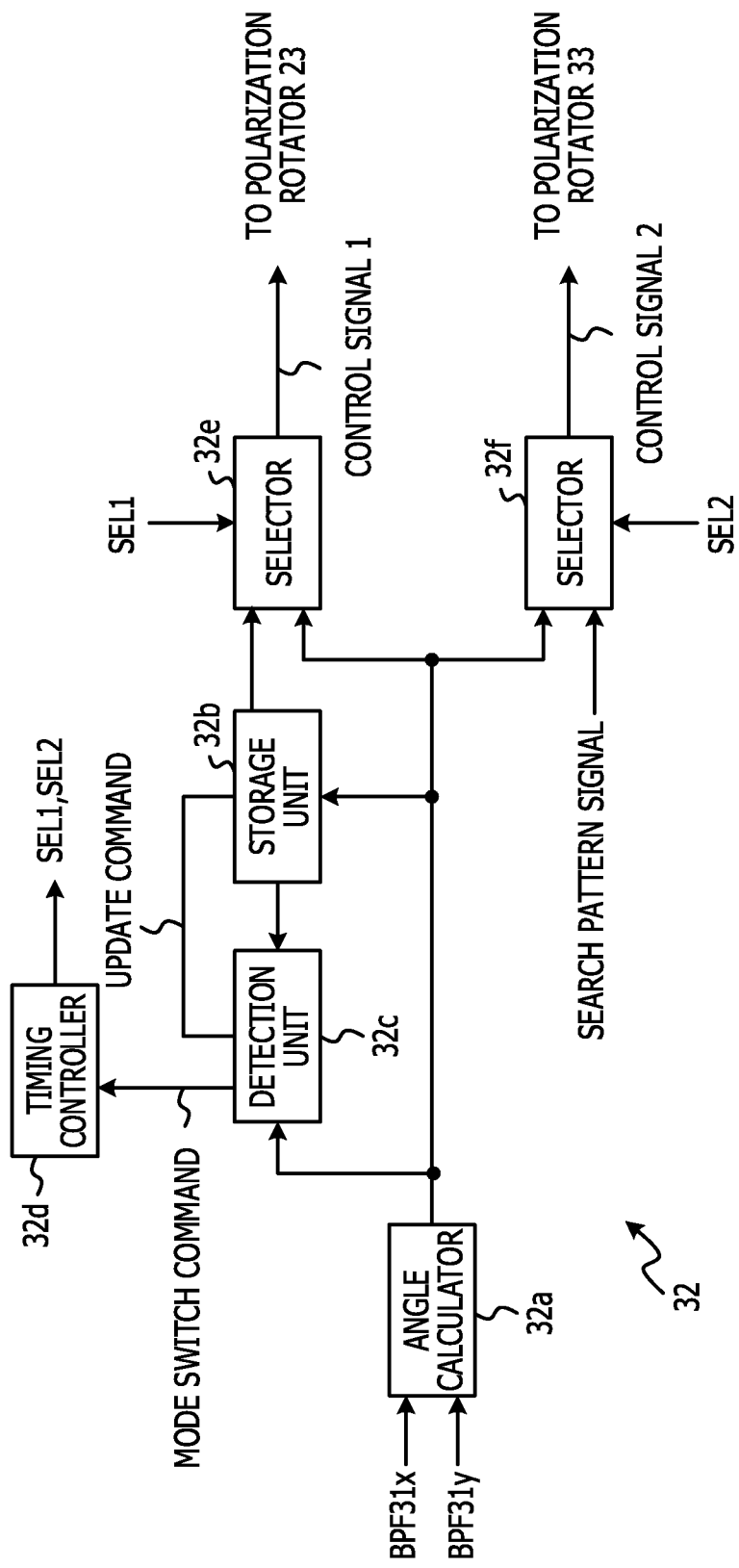
FIG. 9 illustrates an example of a control unit.

FIG. 9 illustrates an example of a control unit. The control unit 32 illustrated in FIG. 9 may perform the polarization state control illustrated in FIG. 8. As illustrated in FIG. 9, the control unit 32 has an angle calculator 32a, a storage unit 32b, a detection unit 32c, a timing controller 32d, and selectors 32e and 32f.

The angle calculator 32a generates a control signal, which corresponds to the polarization state that maximizes the strength of the pilot signal, based on the output signals of the BPFs 31x and 31y. The angle calculator 32a may generate a control signal at a certain interval. The certain interval may be, for example, one period of the pilot signal. The control signal generated by the angle calculator 32a is supplied to the storage unit 32b, the detection unit 32c, and the selectors 32e and 32f.

The storage unit 32b stores the latest control signal calculated by the angle calculator 32a, during a period for which an update command is issued from the detection unit 32c. The storage unit 32 may keep the control signal stored last during a period for which an update command is not issued from the detection unit 32c.

The detection unit 32c compares a control signal supplied from the angle calculator 32a with the control signal stored in the storage unit 32b. When the difference between these two control signals is less than or equal to a certain threshold value, the detection unit 32c determines that the polarization state is stable. In this case, the detection unit 32c issues an update command to the storage unit 32b. The detection unit 32c may not generate a mode switch command. When the difference between the two control signals is greater than the certain threshold value, the detection unit 32c determines that the polarization state has changed rapidly. In this case, the detection unit 32c stops issuing an update command to the storage unit 32b. The detection unit 32c may generate a mode switch command.

Because an update command is issued to the storage unit 32b during a period in which the polarization state is stable, the latest control signal is stored in the storage unit 32b. When a rapid change in the polarization state is detected, the update command is stopped. Thus, after a rapid change in the polarization state is detected, the storage unit 32b holds a control signal which has been obtained immediately before the time when the rapid change is detected.

When a mode switch command is generated in the detection unit 32c, the timing controller 32d switches the operation mode from the normal mode to the search mode. At the start time of the search mode, the timing controller 32d changes selection signal SEL1 from a High level to a Low level and changes selection signal SEL2 from a High level to a Low level.

When the selection signal SEL1 is controlled to be a Low level, the selector 32e selects the control signal stored in the storage unit 32b. When the selection signal SEL2 is controlled to be a Low level, the selector 32f selects a search pattern signal. The search pattern signal may be a control signal for sweeping the polarization angle over a certain range. After the sweeping of the polarization angle based on the search pattern signal is completed, the timing controller 32d changes the selection signal SEL2 from a Low level back to a High level. The selector 32f selects a control signal which is generated by the angle calculator 32a.

When a certain time has passed since a mode switch command was generated, the timing controller 32d changes the selection signal SEL1 from L level back to H level. The "certain time" may correspond to, for example, the delay time of the optical fiber 22. When the selection signal SEL1 changes from a Low level to a High level, the selector 32e selects a control signal which is generated by the angle calculator 32a.

Before the time T1 illustrated in FIG. 8, both the selection signals SEL1 and SEL2 are controlled to be a High level. At this point, the selectors 32e and 32f each select a control signal which is generated by the angle calculator 32a. For example, in this period, substantially the same control signal may be supplied to the polarization rotators 23 and 33.

When the polarization state of an input polarization multiplexed optical signal changes rapidly at the time T1, the detection unit 32b detects the change. The detection unit 32b stops an update command. Thus, the storage unit 32b continues to store a control signal generated immediately before the time T1 until an update command is resumed after the time T1. At the time T1, the timing controller 32d changes the selection signal SEL1 from a High level to a Low level and changes the selection signal SEL2 from a High level to a Low level. The selector 32e selects a control signal which is stored in the storage unit 32b. Thus, after the time T1, the control signal generated immediately before the time T1 is supplied to the polarization rotator 23 which holds the polarization state immediately before the time T1. The selector 32f selects a search pattern signal according to the selection signal SEL2. During the time T1 to T2 illustrated in FIG. 8, the search pattern signal is supplied to the polarization rotator 33 as a control signal. The polarization rotator 33 sweeps the polarization rotation angle by the polarization rotator 33 according to the search pattern signal. Thus, the polarization angle of a polarization multiplexed optical signal input to the polarization separator 25 is swept. In a search period, the angle calculator 32a determines a polarization state (optimal polarization angle) that maximizes the strength of the pilot signal. The angle calculator 32a may hold a control signal corresponding to the optimal polarization angle which is determined in the search period.

When the search mode is terminated at the time T2, the operation mode of the control unit 32 resumes to the normal mode. The selector 32f selects a control signal which is generated by the angle calculator 32a. After the time T2, the polarization rotator 33 controls the polarization state of an input polarization multiplexed optical signal according to a control signal which changes while following the polarization state of the input polarization multiplexed optical signal. At the time T2, a control signal corresponding to the optimal polarization angle may be given to the polarization rotator 33 as an initial value of the polarization rotation angle.

When the delay time of the optical fiber 22 has passed since the polarization state rapidly changed at the time T1, the timing controller 32d changes the selection signal SEL1 from a Low level back to a High level. Thus, the selector 32e selects a control signal which is generated by the angle calculator 32a. After the time T3, the polarization rotator 33 controls the polarization state of a delayed polarization multiplexed optical signal according to a control signal which changes while following the polarization state of an input polarization multiplexed optical signal. At the time T3, a control signal corresponding to the optimal polarization angle may be given to the polarization rotator 23 as an initial value of the polarization rotation angle.

For example, in FIGS. 8 and 9, when the polarization state of an input polarization multiplexed optical signal changes rapidly at the time T1, the polarization state after the change is searched using the polarization rotator 33. The search may be performed in a time shorter than the delay time of the optical fiber 22. When the delay time of the optical fiber 22 has passed since the polarization state rapidly changed, a control signal corresponding to a new polarization state determined by the search is supplied to the polarization rotator 23 at the time T3. Even when the polarization state of an input polarization multiplexed optical signal changes rapidly, the following of the polarization state of a polarization multiplexed optical signal may be immediately resumed. Thus, deterioration of quality of a set of optical signals extracted from the polarization multiplexed optical signal may be reduced.

For example, in FIGS. 6 to 9, a pilot signal may be superimposed on each of both optical signals S1 and S2 which are multiplexed in a polarization multiplexed optical signal. For example, the optical receiver illustrated in FIG. 7 may receive a polarization multiplexed optical signal which is generated by the optical transmitter illustrated in FIG. 2. The optical receiver 20 may receive a polarization multiplexed light in which a pilot signal is superimposed on at least one of a first polarization and a second polarization.

For example, in the optical transmission system, a pilot signal is superimposed on one or both of the optical signals S1 and S2 in a polarization multiplexed optical signal. The optical receiver 20 may have a function of canceling the pilot signal. The "canceling" may also include processing that makes the pilot signal zero, and may also include processing that reduces the pilot signal.

Figure 10:
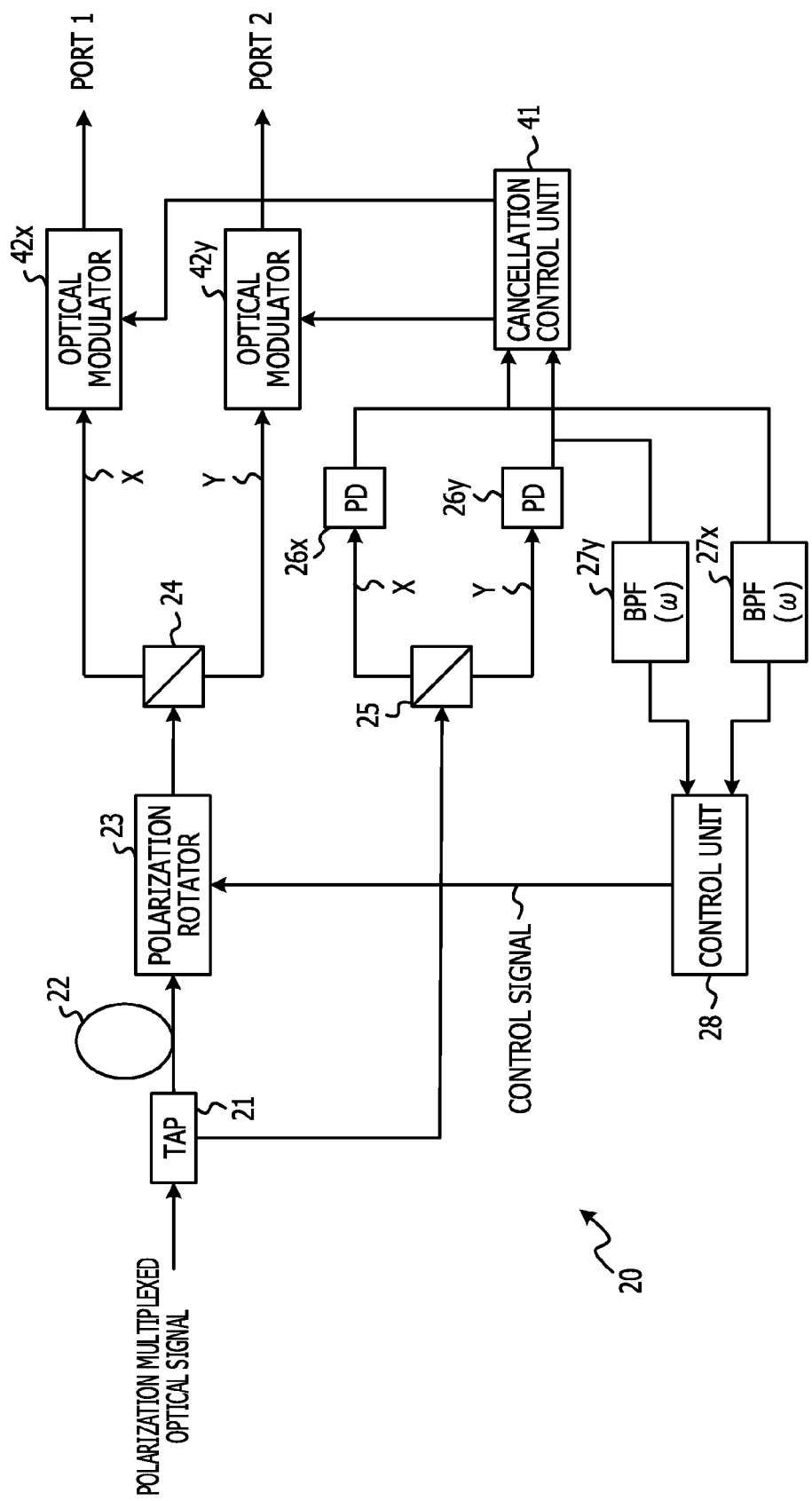
FIG. 10 illustrates an example of an optical receiver.
Figure 11:
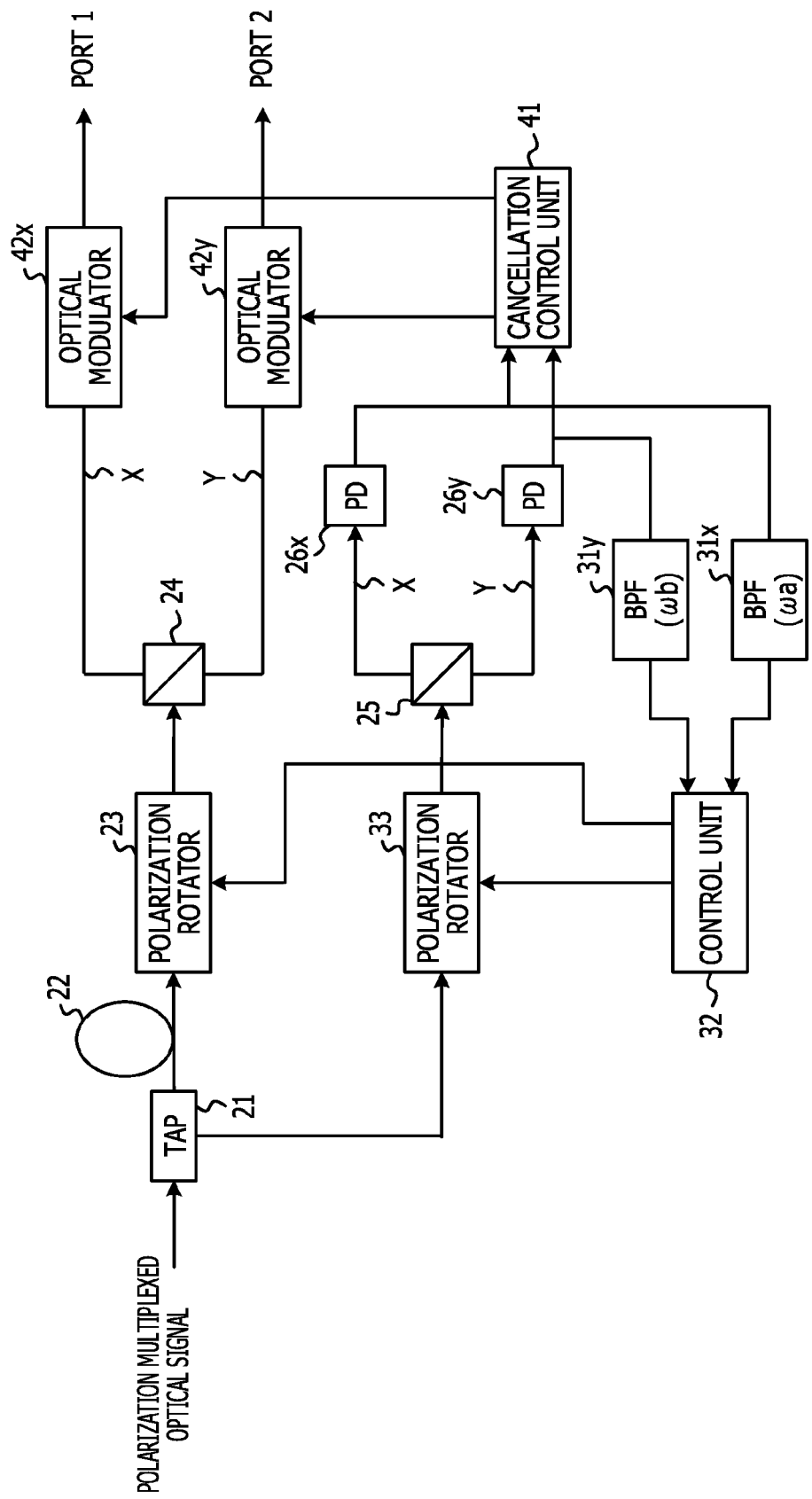
FIG. 11 illustrates an example of an optical receiver.

FIG. 10 and FIG. 11 illustrate an example of an optical receiver. In FIG. 10, the configuration is illustrated in which a function of canceling the pilot signal is added to the optical receiver illustrated in FIG. 3. In FIG. 11, the configuration is illustrated in which a function of canceling the pilot signal is added to the optical receiver illustrated in FIG. 7.

A cancellation control unit 41 detects a pilot signal which is superimposed on the polarization components x and y obtained by the polarization separator 25. The cancellation control unit 41 illustrated in FIG. 10 detects a pilot signal P which is superimposed on the polarization components x and y. The cancellation control unit 41 illustrated in FIG. 11 detects pilot signals P1 and P2 which are superimposed on the polarization components x and y, respectively. Although the cancellation control unit 41 illustrated in FIGS. 10 and 11 detects a pilot signal using the output signals of the optical receivers 26x and 26y, the cancellation control unit 41 may detect a pilot signal using the output signal of the BPF. For example, the cancellation control unit 41 illustrated in FIG. 10 may detect a pilot signal P using the output signals of the BPFs 26x and 26y. The cancellation control unit 41 illustrated in FIG. 11 may detect pilot signals P1 and P2 using the output signals of the BPFs 31x and 31y.

The optical modulator 42x modulates one (polarization component X) of polarizations, which is obtained from the polarization separator 24, based on a cancellation signal supplied from the cancellation control unit 41. The optical modulator 42y modulates the other one (polarization component Y) of polarizations, which is obtained from the polarization separator 24, based on a cancellation signal supplied from the cancellation control unit 41.

The cancellation control unit 41 sends a cancellation signal to the optical modulators 42x and 42y, the cancellation signal for canceling a pilot signal which is detected from the polarization components x and y. For example, the cancellation control unit 41 illustrated in FIG. 10 sends to the optical modulator 42x a cancellation signal for canceling a pilot signal detected from the polarization component x, and sends to the optical modulator 42y a cancellation signal for canceling a pilot signal detected from the polarization component y. Thus, a pilot signal is canceled in each of the optical signals guided to the ports 1 and 2, and the quality of the optical signals may improve.

When each optical signal in a polarization multiplexed optical signal is an intensity modulated optical signal, the quality of the optical signal may deteriorate due to the polarization dependent gain of the optical amplifiers provided in the transmission path. Thus, for example, deterioration of the quality caused by the polarization dependent gain may be reduced using polarization rotation.

Figure 12:
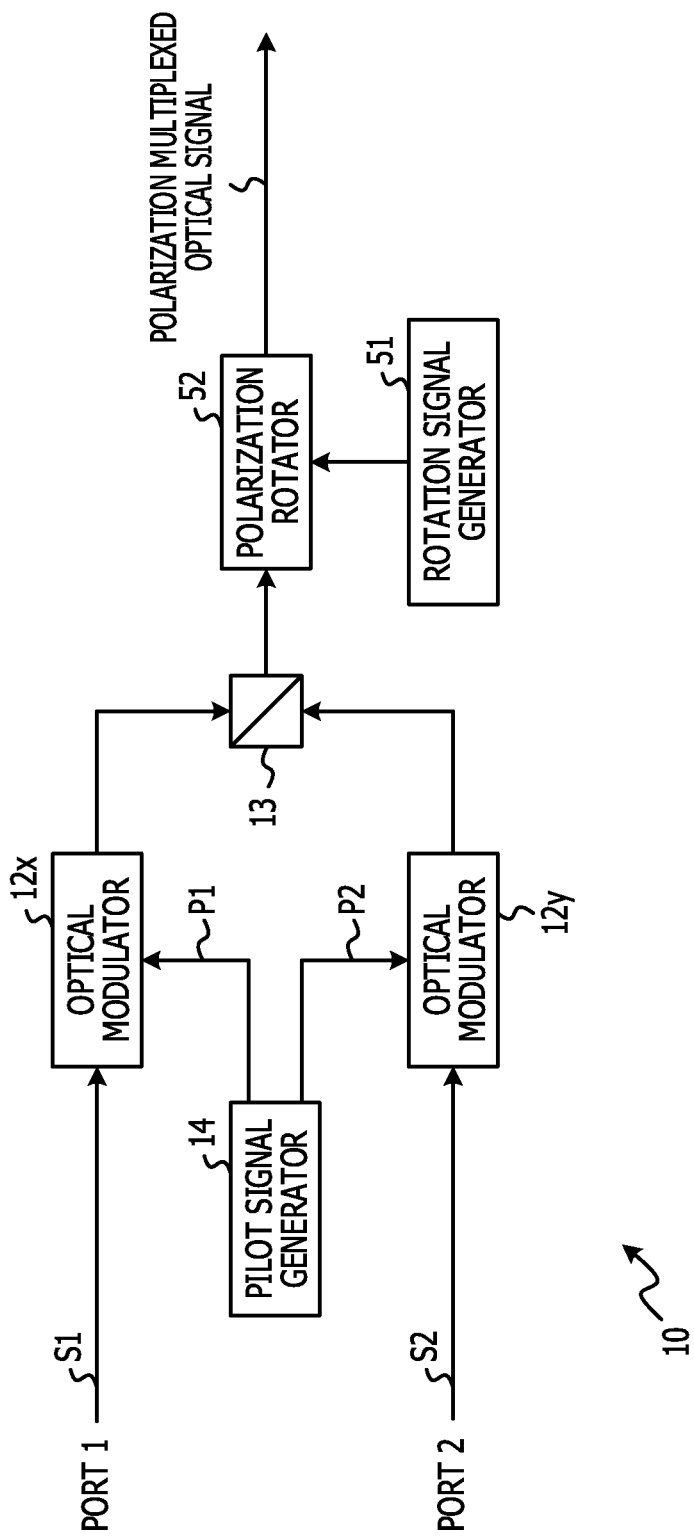
FIG. 12 illustrates an example of an optical transmitter.

FIG. 12 illustrates an example of an optical transmitter. The optical transmitter illustrated in FIG. 12 may have a configuration in which a rotation signal generator 51 and a polarization rotator 52 are added to the optical transmitter 10 illustrated in FIG. 6.

The rotation signal generator 51 generates a rotation signal. The rotation signal may be, for example, a sine wave signal. The frequency of the rotation signal may be sufficiently low compared with the symbol rates of the optical signals S1 and S2. The frequency of the rotation signal may be different from that of the pilot signals P1 and P2. The polarization rotator 52 rotates the polarization of a polarization multiplexed optical signal, which is output from the polarization multiplexer 13, according to the rotation signal.

Figure 13:
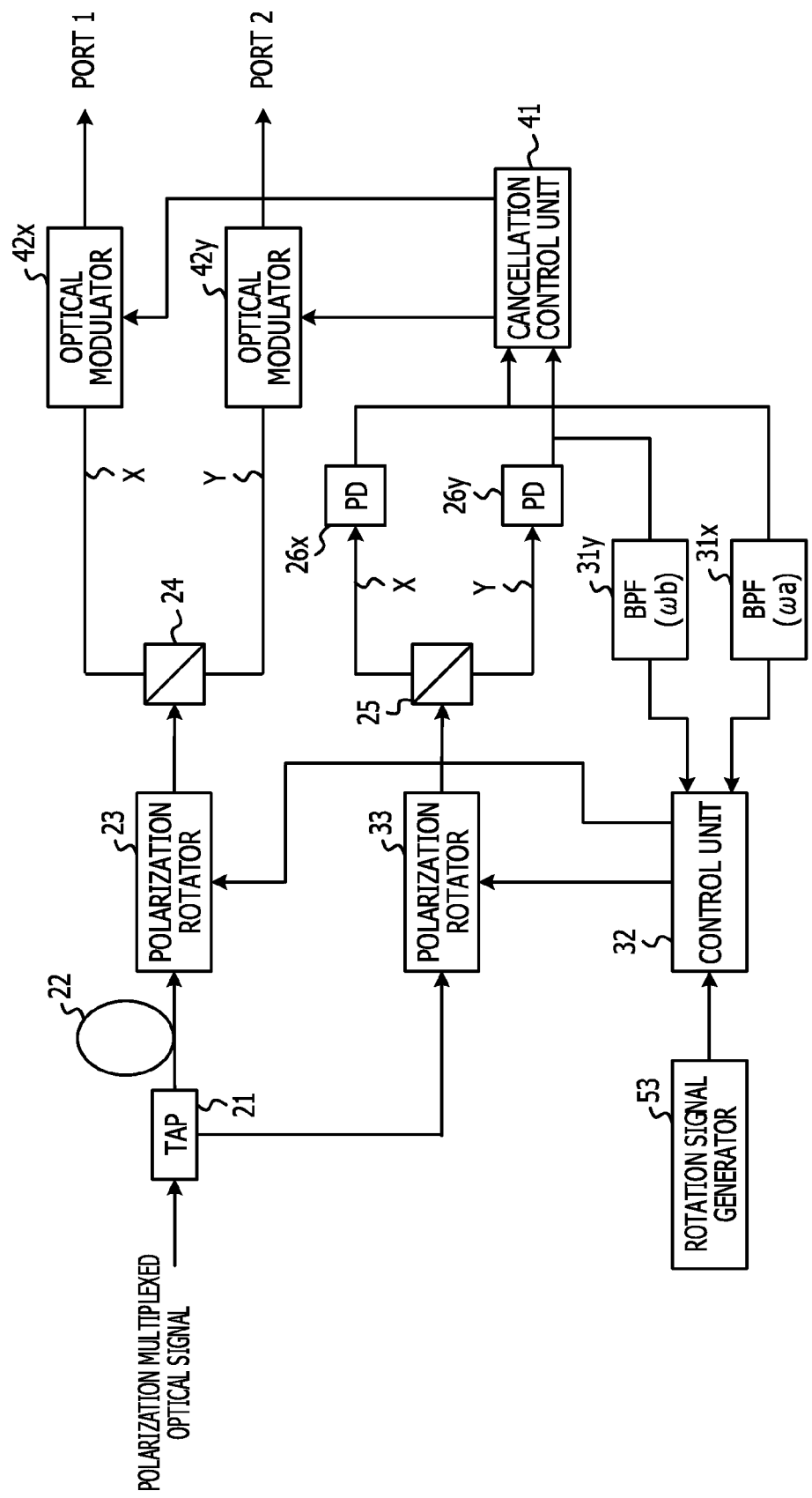
FIG. 13 illustrates an example of an optical receiver.

FIG. 13 illustrates an example of an optical receiver. The optical receiver illustrated in FIG. 13 may have a configuration in which a function of canceling a polarization rotation is added to the optical transmitter 10 illustrated in FIG. 7. The optical receiver illustrated in FIG. 13 may receive a polarization multiplexed optical signal which is generated by the optical transmitter illustrated in FIG. 12.

A rotation signal generator 53 generates a rotation signal which is substantially the same as that of the rotation signal generator 51 provided in a corresponding optical transmitter. The control unit 32 generates a reverse rotation signal that cancels the rotation signal, and superimposes the reverse rotation signal on a control signal to be supplied to the polarization rotators 23 and 33. The polarization rotators 23 and 33 each control the polarization state of a polarization multiplexed optical signal according to the control signal on which the reverse rotation signal is superimposed. Therefore, the optical receiver may separate each optical signal in a polarization multiplexed optical signal with sufficient precision without being affected by the rotation signal.

In polarization multiplexed transmission, the wavelength of each optical signal in a polarization multiplexed optical signal may be substantially the same. A set of optical signals multiplexed in a polarization multiplexed optical signal may be generated from a light beam which is generated, for example, by a single light source.

Figure 14:
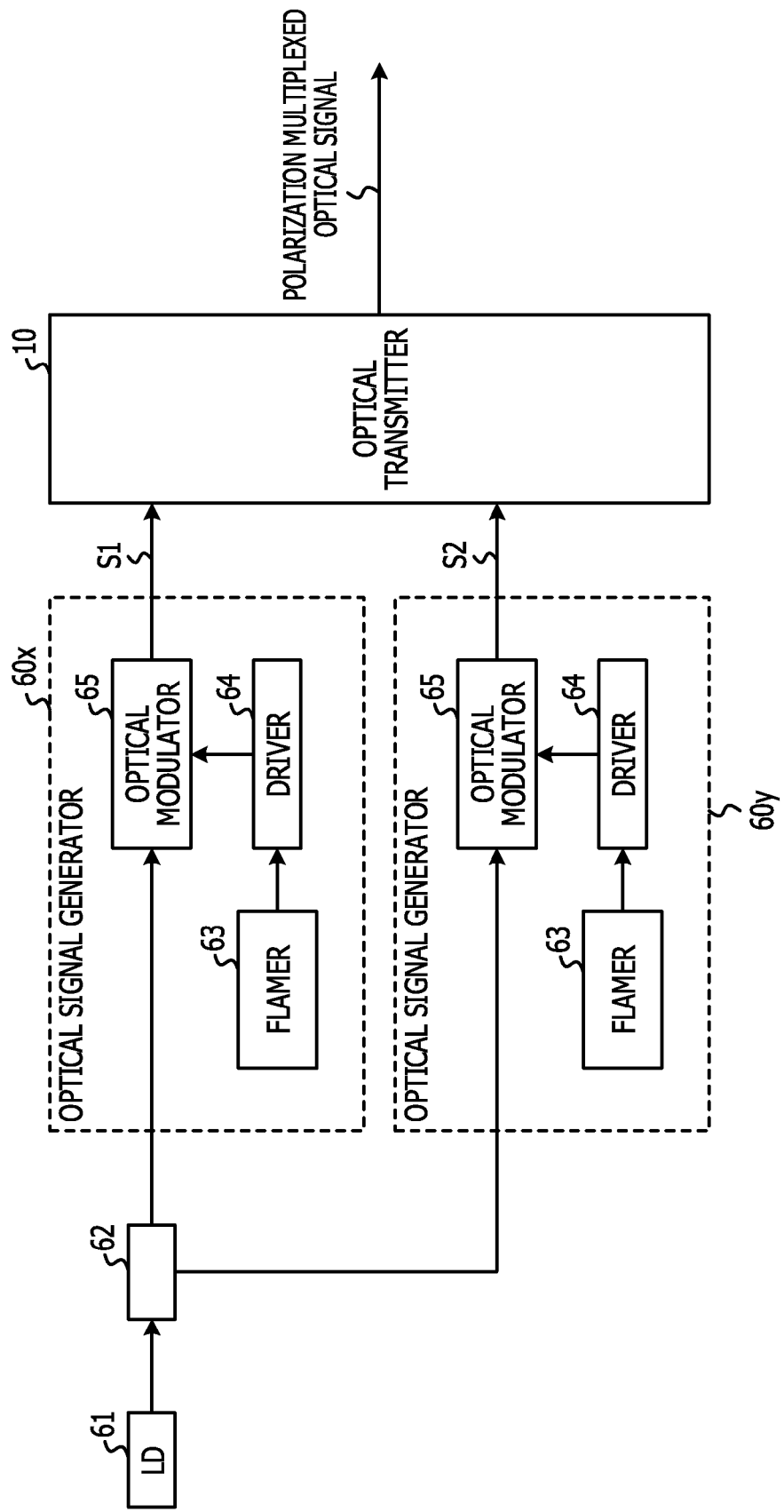
FIG. 14 illustrates an example of an optical signal generation circuit.

FIG. 14 illustrates an example of an optical signal generation circuit. In FIG. 14, a circuit is illustrated that generates an optical signal which is multiplexed in a polarization multiplexed optical signal. The circuit illustrated in FIG. 14 has optical signal generators 60x and 60y, a laser light source (LD) 61, and an optical splitter 62. The laser light source 61 outputs a light beam having a specified wavelength. The optical splitter 62 causes the light beam output from the laser light source 61 to branch to the optical signal generators 60x and 60y. The branching ratio of the optical splitter 62 may be 1:1.

The configurations of the optical signal generators 60x and 60y may be substantially the same or similar to each other. A flamer 63 generates a frame that stores transmission data. The frame may be an OTN frame, for example. A driver 64 generates a drive signal that represents the frame generated by the frame 63. The optical modulator 65 generates a modulated optical signal by modulating a light beam with the drive signal from the driver 64. The optical signal generators 60x and 60y generate optical signal S1 and S2, respectively. The optical signals S1 and S2 generated by the optical signal generator 60x or 60y may be guided to the optical transmitter 10 illustrated in FIG. 2, 6, or 12.

Figure 15:
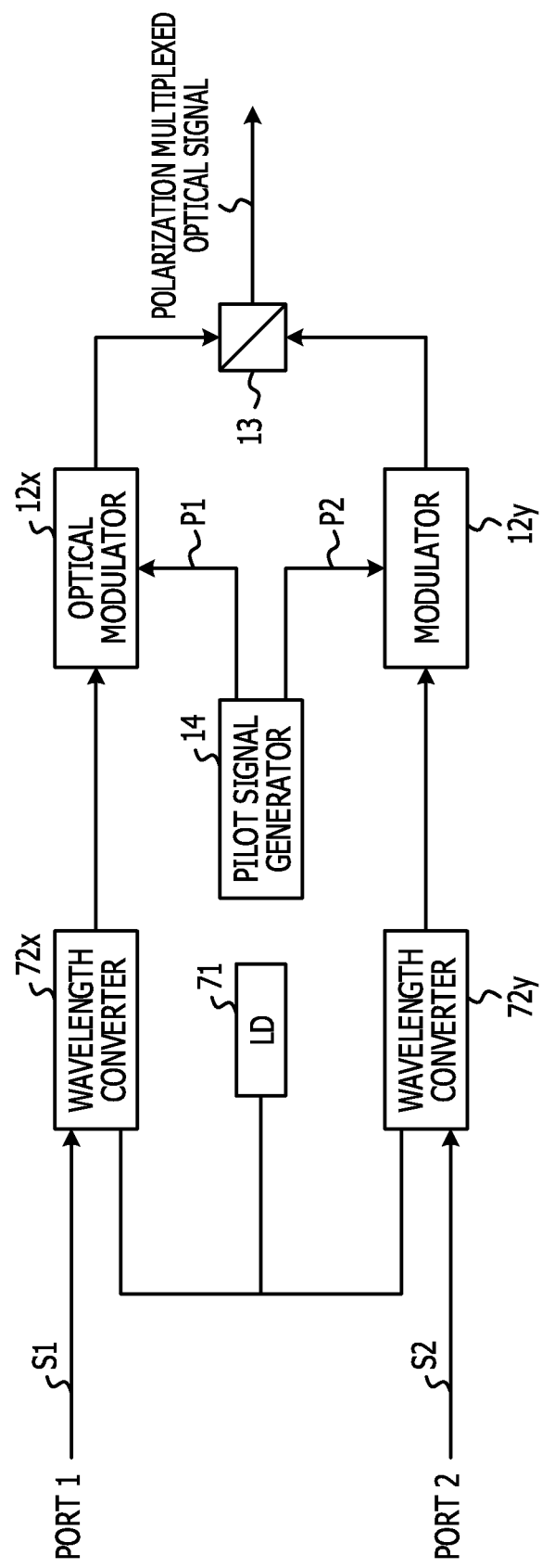
FIG. 15 illustrates an example of an optical transmitter having a wavelength conversion function.
Figure 16:
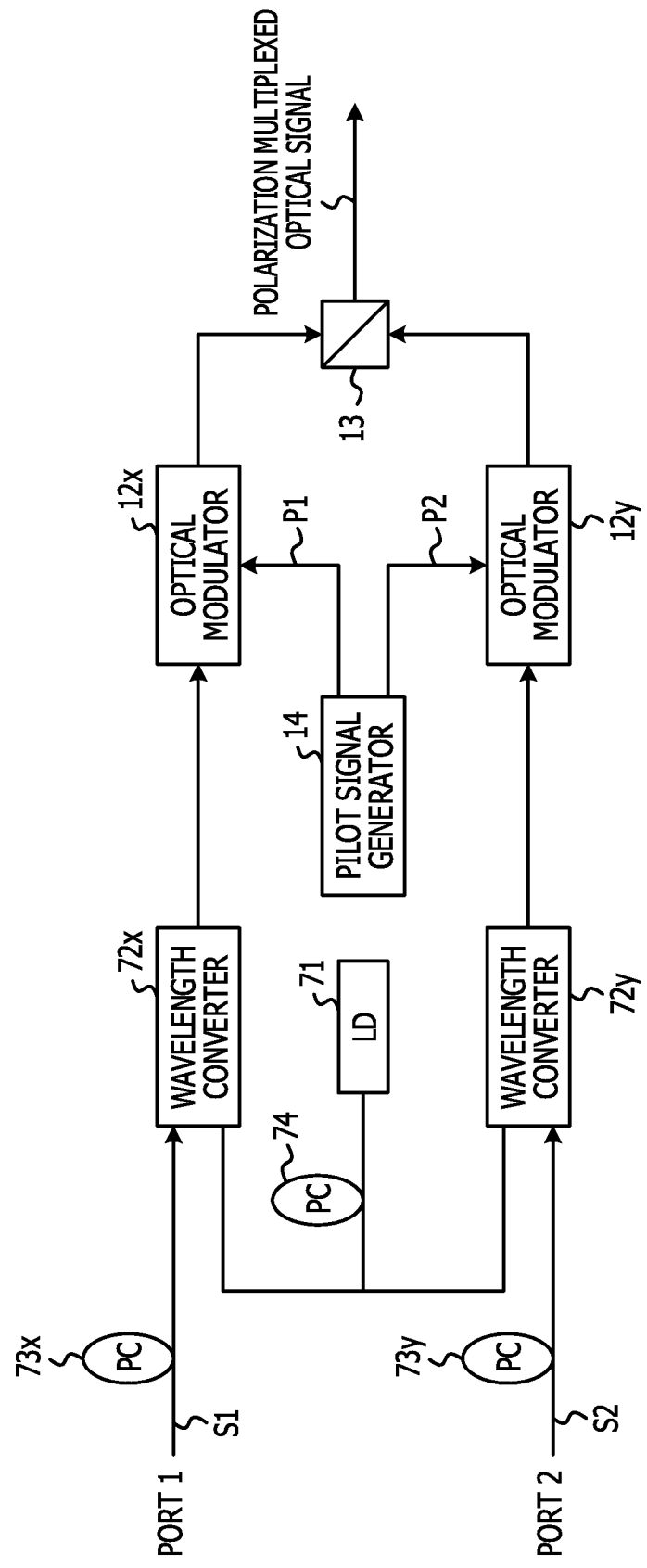
FIG. 16 illustrates an example of an optical transmitter having a wavelength conversion function.

When the optical signals S1 and S2 input to the optical transmitter 10 are generated using different light sources, wavelength conversion may be performed in the optical transmitter. FIGS. 15 and 16 illustrate an example of an optical transmitter having a wavelength conversion function. For example, the optical transmitter 10 illustrated in FIG. 15 has a laser light source 71 and wavelength converters 72x and 72y in addition to the pilot signal generator 14, the optical modulators 12x and 12y, and the polarization multiplexer 13. The laser light source 71 outputs a light beam having a specified wavelength. The light beam equally branches to the wavelength converters 72x and 72y.

The wavelength converter 72x converts the wavelength of the optical signal S1 to the wavelength of the laser light source 71. Similarly, the wavelength converter 72y converts the wavelength of the optical signal S2 to the wavelength of the laser light source 71. Thus, the optical signals S1 and S2 having substantially the same wavelength may be multiplexed.

The polarization of the input optical signals S1 and S2 and the polarization of the light beam output from the laser light source 71 may be fixed in substantially the same direction. In this case, the optical transmitter has polarization controllers 73x, 73y, and 74 as illustrated in FIG. 16. The polarization controllers 73x and 73y each adjust the direction of the polarization of the input optical signal S1 or S2 to a certain direction and holds the adjusted direction. The polarization controller 74 adjusts the direction of a light beam polarization output from the laser light source 71 to a certain direction and holds the adjusted direction.

Figure 17:
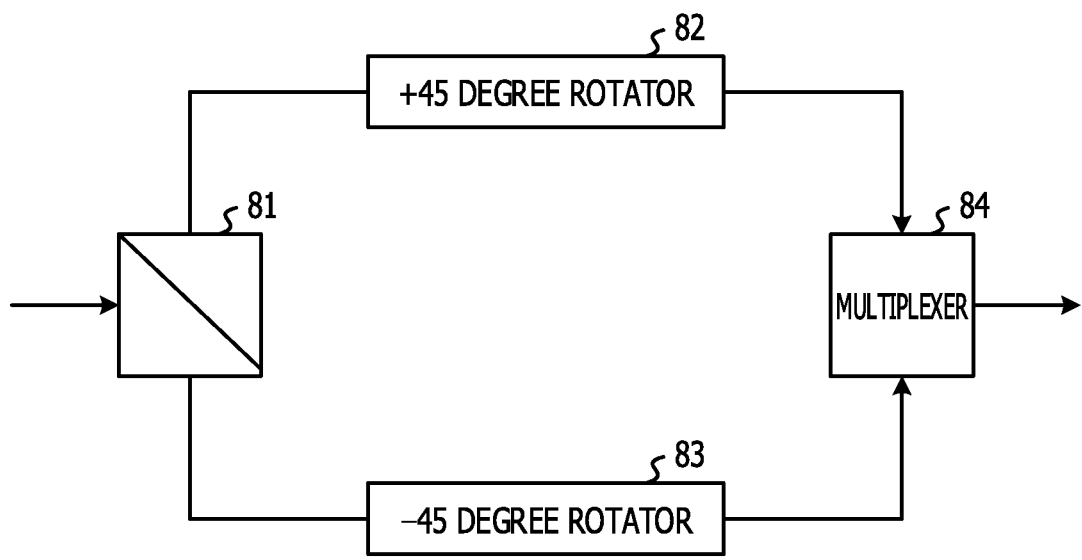
FIG. 17 illustrates an example of a polarization controller.

FIG. 17 illustrates an example of a polarization controller. The polarization controller (73x, 73y, 74) illustrated in FIG. 17 has an optical splitter 81, +45 degree rotator 82, −45 degree rotator 83, and a multiplexer 84. The optical splitter 81 causes input light to branch to the +45 degree rotator 82 and the −45 degree rotator 83. The +45 degree rotator 82 fixes the polarization direction of the input to "+45 degrees". The −45 degree rotator 83 fixes the polarization direction of the input to "−45 degrees". The multiplexer 84 multiplexes light with polarization fixed by the +45 degree rotator 82 and light with polarization fixed by the −45 degree rotator 83.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
an optical brancher configured to branch polarization multiplexed light to a first polarization multiplexed light and a second polarization multiplexed light and output the first polarization multiplexed light and the second polarization multiplexed light to a first output path and a second output path which is different from the first output path, respectively, the polarization multiplexed light in which a pilot signal is superimposed on at least one of a first polarization and a second polarization;
an optical fiber, corresponding to the first output path, configured to transmit the first polarization multiplexed light;
a first polarization rotator, coupled to the first output path, configured to control a first polarization state of the first polarization multiplexed light output from the optical fiber;
a first polarization separator, coupled to the second output path, configured to separate the second polarization multiplexed light which is output from the second output path into a third polarization and a fourth polarization;
a second polarization separator, coupled to an output of the first polarization rotator and being different from the first polarization separator, configured to perform polarization separation on the first polarization multiplexed light output from the first polarization rotator and output the separated first polarization multiplexed light to a first port and a second port;
a controller configured to control the first polarization rotator based on one of a first pilot signal included in the third polarization and a second pilot signal included in the fourth polarization in such a manner that the first polarization state of the first polarization multiplexed optical signal output from the first polarization rotator matches a polarization axis of the second polarization separator;
a second polarization rotator, provided between the optical brancher and the first polarization separator and in parallel with the first polarization rotator, configured to control a second polarization state of the second polarization multiplexed light and to supply the controlled second polarization multiplexed light to the first polarization separator;
optical receivers, coupled to the second polarization rotator, configured to convert the third polarization and the fourth polarization output from the first polarization separator to electrical signals, respectively; and
filters, coupled to the respective optical receivers, configured to extract the first pilot signal from the third polarization and the second pilot signal from the fourth polarization, respectively.

2. The optical receiver according to claim 1, wherein the second polarization separator is configured to extract mutually orthogonal polarization components from the first polarization multiplexed light output from the first polarization rotator, which are to be output to the first port and the second port, respectively.

3. The optical receiver according to claim 1,
wherein the optical fiber includes a polarization-maintaining optical fiber that maintains polarization.

4. The optical receiver according to claim 2,
wherein a direction of a polarization axis of the first polarization separator is the same as a direction of a polarization axis of the second polarization separator.

5. The optical receiver according to claim 1, wherein the controller controls the first polarization rotator and the second polarization rotator so that a strength of the first pilot signal and a strength of the second pilot signal are increased.

6. The optical receiver according to claim 1,
wherein the controller monitors a strength of the first pilot signal and a strength of the second pilot signal, calculates a polarization rotation angle based on monitoring results, and controls the first polarization rotator to rotate by the polarization rotation angle.

7. The optical receiver according to claim 1, wherein a transmission delay time due to the optical fiber is longer than a time taken for the controller to generate a control signal which controls the first polarization rotator and the second polarization rotator.

8. The optical receiver according to claim 1, wherein the controller monitors a strength of the pilot signal while sweeping a polarization rotation angle of the second polarization rotator, determines a polarization state of the polarization multiplexed light, and controls the first polarization rotator based on a determined polarization state.

9. An optical signal processing method comprising:
branching polarization multiplexed light to a first polarization multiplexed light and a second polarization multiplexed light and outputting the first polarization multiplexed light and the second polarization multiplexed light to a first output path and a second output path which is different from the first output path, respectively, the polarization multiplexed light in which a pilot signal is superimposed on at least one of a first polarization and a second polarization;
delaying the first polarization multiplexed light by an optical fiber corresponding to the first output path;
separating, by a first polarization separator coupled to the second output path, the second polarization multiplexed light which is output from the second output path into a third polarization and a fourth polarization;
performing, by a second polarization separator coupled to an output of the first polarization rotator and being different from the first polarization separator, polarization separation on the first polarization multiplexed light output from the first polarization rotator and output the separated first polarization multiplexed light to a first port and a second port;
controlling, by a second polarization rotator which is provided between the optical brancher and the first polarization separator and in parallel with the first polarization rotator, a second polarization state of the second polarization multiplexed light and supplying the controlled second polarization multiplexed light to the first polarization separator;
converting, by optical receivers coupled to the second polarization rotator, the third polarization and the fourth polarization output from the first polarization separator to electrical signals, respectively;
extracting, by filters coupled to the respective optical receivers, the first pilot signal from the third polarization and the second pilot signal from the fourth polarization, respectively;
determining a polarization rotation angle based on one of the first pilot signal and the second pilot signal in such a manner that a first polarization state of the first polarization multiplexed optical signal output from the first polarization rotator matches a polarization axis of the second polarization separator; and
compensating a delayed first polarization multiplexed light according to the polarization rotation angle.

10. The optical signal processing method according to claim 9, further comprising:
monitoring a strength of the pilot signal to determine a polarization state of the polarization multiplexed light.

11. The optical signal processing method according to claim 10, wherein the polarization rotation angle is calculated such that the strength of the pilot signal increases.

12. An optical transmission system that performs optical transmission between an optical transmitter and an optical receiver, the optical receiver comprising:
an optical brancher configured to branch polarization multiplexed light to a first polarization multiplexed light and a second polarization multiplexed light and output the first polarization multiplexed light and the second polarization multiplexed light to a first output path and a second output path which is different from the first output path, respectively, the polarization multiplexed light which is generated by the optical transmitter and in which a pilot signal is superimposed on at least one of a first polarization and a second polarization;
an optical fiber, corresponding to the first output path, configured to transmit the first polarization multiplexed light;
a first polarization rotator, coupled to the first output path, configured to control a first polarization state of the first polarization multiplexed light output from the optical fiber;
a first polarization separator, coupled to the second output path, configured to separate the second polarization multiplexed light which is output from the second output path into a third polarization and a fourth polarization;
a second polarization separator, coupled to an output of the first polarization rotator and being different from the first polarization separator, configured to perform polarization separation on the first polarization multiplexed light output from the first polarization rotator and output the separated first polarization multiplexed light to a first port and a second port; and
a controller configured to control the first polarization rotator based on one of a first pilot signal included in the third polarization and a second pilot signal included in the fourth polarization in such a manner that the first polarization state of the first polarization multiplexed optical signal output from the first polarization rotator matches a polarization axis of the second polarization separator; and
a second polarization rotator, provided between the optical brancher and the first polarization separator and in parallel with the first polarization rotator, configured to control a second polarization state of the second polarization multiplexed light and to supply the controlled second polarization multiplexed light to the first polarization separator;

optical receivers, coupled to the second polarization rotator, configured to convert the third polarization and the fourth polarization output from the first polarization separator to electrical signals, respectively; and filters, coupled to the respective optical receivers, configured to extract the first pilot signal from the third polarization and the second pilot signal from the fourth polarization, respectively.

13. The optical transmission system according to claim 12, wherein the second polarization separator is configured to extract mutually orthogonal polarization components from the first polarization multiplexed light output from the first polarization rotator which are to be output to the first port and the second port, respectively.

14. The optical transmission system according to claim 12, wherein the controller monitors a strength of the first pilot signal and a strength of the second pilot signal, calculates a polarization rotation angle based on monitoring results and controls the first polarization rotator to rotate by the polarization rotation angle.

15. The optical transmission system according to claim 12, wherein a transmission delay time due to the optical fiber is longer than a time taken for the controller t generate a control signal which controls the first polarization rotator and the second polarization rotator.

16. The optical transmission system according to claim 12, wherein the controller monitors a strength of the pilot signal while sweeping a polarization rotation angle of the second polarization rotator, determines a polarization state of the polarization multiplexed light, and controls the first polarization rotator based on a determined polarization state.

* * * * *